(12) United States Patent
Sunder

(10) Patent No.: US 10,648,932 B2
(45) Date of Patent: May 12, 2020

(54) MEASURING AND ANALYZING RESIDUAL STRESSES AND THEIR GRADIENTS IN MATERIALS USING HIGH RESOLUTION GRAZING INCIDENCE X-RAY DIFFRACTION

(71) Applicant: International Business Machines Corporation, Armonk, NY (US)

(72) Inventor: Madhana Sunder, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/822,785

(22) Filed: Nov. 27, 2017

(65) Prior Publication Data

US 2019/0094160 A1 Mar. 28, 2019

Related U.S. Application Data

(63) Continuation of application No. 15/718,062, filed on Sep. 28, 2017.

(51) Int. Cl.
  *G01N 23/207* (2018.01)
  *G01N 23/20016* (2018.01)

(52) U.S. Cl.
  CPC ..... *G01N 23/207* (2013.01); *G01N 23/20016* (2013.01); *G01N 2223/0563* (2013.01); *G01N 2223/303* (2013.01); *G01N 2223/607* (2013.01)

(58) Field of Classification Search
  CPC .................................................. G01N 23/207
  See application file for complete search history.

(56) References Cited

U.S. PATENT DOCUMENTS

| 7,623,223 B2 | 11/2009 | Naka et al. |
| 8,409,702 B2 | 4/2013 | Ni et al. |
| 8,502,979 B2 | 8/2013 | Levy et al. |
| 9,305,680 B2 | 4/2016 | Yamazaki et al. |

(Continued)

OTHER PUBLICATIONS

Office Action dated Jun. 17, 2019 received in the parent U.S. Appl. No. 15/718,062, Copy Not Enclosed.

(Continued)

*Primary Examiner* — Yara B Green
(74) *Attorney, Agent, or Firm* — Scully, Scott, Murphy & Presser, P.C.; Steven J. Meyers

(57) ABSTRACT

A high resolution grazing incidence X-ray diffraction technique for measuring residual stresses and their gradients as a function of depth in thin film materials on substrates or in bulk materials is disclosed. The technique includes positioning a material relative to an X-ray source and an X-ray detector, performing an Omega scan to determine an Omega offset, setting the incidence angle at a first target incidence angle based on the Omega offset and greater than the critical angle of the material, performing a grazing incidence X-ray diffraction scan, analyzing the results to identify diffraction peaks, selecting a diffraction peak, setting the incidence angle at a second target incidence angle based on the Omega offset and a desired penetration depth, performing two theta scanning on a range of two theta values around the selected diffraction peak, performing refraction correction, and determining residual stress values for the material.

11 Claims, 17 Drawing Sheets

(56) References Cited

U.S. PATENT DOCUMENTS

| | | |
|---|---|---|
| 9,613,728 B2 | 4/2017 | Brauss |
| 2013/0089182 A1* | 4/2013 | Wang .................... G01N 23/20 378/72 |
| 2015/0050490 A1* | 2/2015 | Kumar .................... C04B 35/66 428/336 |
| 2016/0215387 A1 | 7/2016 | Liu et al. |
| 2017/0167988 A1 | 6/2017 | Kobayashi et al. |
| 2018/0202872 A1 | 7/2018 | Osten et al. |

OTHER PUBLICATIONS

Ma, C.-H., et al., "Residual stress measurement in textured thin film by grazing-incidence X-ray diffraction", Thin Solid Films, Accepted Jul. 22, 2002, pp. 73-78, vol. 418, Issue 2.

Kampfe, A., et al., "X-Ray Analysis of Depth Distributions of Residual Stresses and Stress-free Lattice Parameters in PVD Gradient Coatings of Ti(C,N) on Cemented Carbide", JCPDS—International Centre for Diffraction Data 1997, Presented at the Denver X-ray Conference (DXC) on Applications of X-ray Analysis, Aug. 4-8, 1997, 15 pages, vol. 40.

James, R.W., "The Dynamical Theory of X-Ray Diffraction", Solid State Physics, 1963, Available online May 5, 2008, pp. 53-220, vol. 15.

Davies, B., "Precision and accuracy in glacial geology", AntarcticGlaciers.org, http://www.antarcticglaciers.org/glacial-geology/dating-glacial-sediments-2/prcision-and-accuracy-glacial-geology/, Last Updated on Nov. 21, 2013, Printed on Sep. 13, 2017, 5 pages.

List of IBM Patents or Patent Applications Treated as Related, dated Nov. 27, 2017, 2 pages.

\* cited by examiner

Compressive Stress

Tensile Stress

Penetration depth of X-rays in GID mode

- $\frac{u}{p}$ is the Mass attenuation coefficient of X-rays

- $p$ is the density of the Thin film

Penetration depth $D_{max}$ is defined as: $I_{Dmax} = 0.01 * I_o$ $$D_{max} = \frac{4.606 * \sin \theta}{2*(u/p)*p}$$

$D_{max}$ is a function of material properties, energy of X-rays being used and incident angle of X-ray

MEASURING AND ANALYZING RESIDUAL STRESSES AND THEIR GRADIENTS IN MATERIALS USING HIGH RESOLUTION GRAZING INCIDENCE X-RAY DIFFRACTION

BACKGROUND

The present disclosure relates to thin film materials deposited, grown, or produced in any other manner on substrates or to bulk materials and the measurement and analysis of the bulk materials or thin film materials for residual stresses and their gradients using high resolution grazing incidence X-ray diffraction.

Stress may be defined as the ratio of force applied to a cross sectional area of a material. Stresses on a material may be either tensile or compressive. Materials undergo elastic and plastic deformations as force is applied. Plastic deformation is permanent non-recoverable deformation. Elastic deformation is recoverable and temporary, e.g., no permanent change is made to the material and the atoms return to the original position when the force is removed.

Residual stresses are defined as elastic stresses that remain in the material following processing. Excessive residual stresses present in bulk materials or in thin film materials could lead to failure of the materials during use. Residual elastic stresses in thin film material deposits and coatings may occur in many industries where thin film materials and coatings are used and produced such as aerospace, automotive, biomedical, ceramics, coatings, electronics, energy, metals, optics, thin film material deposition tool manufacturing, Semiconductor and Packaging, and other similar industries. X-ray diffraction techniques may be used to measure residual stresses in materials by measuring changes in the spacing between atomic planes in the materials, also known as $d_{spacing}$ or d-spacing.

BRIEF SUMMARY

The system, method, and computer program product described herein provide ways of measuring and analyzing residual stresses and their gradients in thin film materials deposited, grown, or produced in any other manner on substrates or in bulk materials using high resolution grazing incidence X-ray diffraction.

In an aspect of the present disclosure, a method is disclosed that includes performing an Omega scan to determine an Omega offset of an X-ray beam generated by an X-ray source relative to a material with respect to an incidence angle between the X-ray source and the material, setting the incidence angle between the X-ray source and the material at a first target incidence angle that is based on the Omega offset and greater than the critical angle of the material, performing a grazing incidence X-ray diffraction scan on the material to generate first measurement data including intensities of X-ray photons at a plurality of two theta angles, analyzing the first measurement data to identify a plurality of diffraction peaks from the material each of which has an intensity occurring at a corresponding two theta value, selecting a diffraction peak of the plurality of diffraction peaks based on the analysis of the first measurement data, setting the incidence angle between the X-ray source and the material at a second target incidence angle based on the Omega offset and a desired penetration depth into the material, and performing two theta scanning on the material on a range of two theta values around the two theta value of the selected diffraction peak at a plurality of tilt positions to generate second measurement data, applying refraction correction to the second measurement data, the refraction correction correcting the second measurement data for each tilt position of the scanned range of two theta values around the two theta value of the selected diffraction peak, converting the corrected second measurement data measured at each tilt position to a d-spacing for each tilt position, and determining residual stress values of the material based on the converted corrected second measurement data.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

Figure 1:
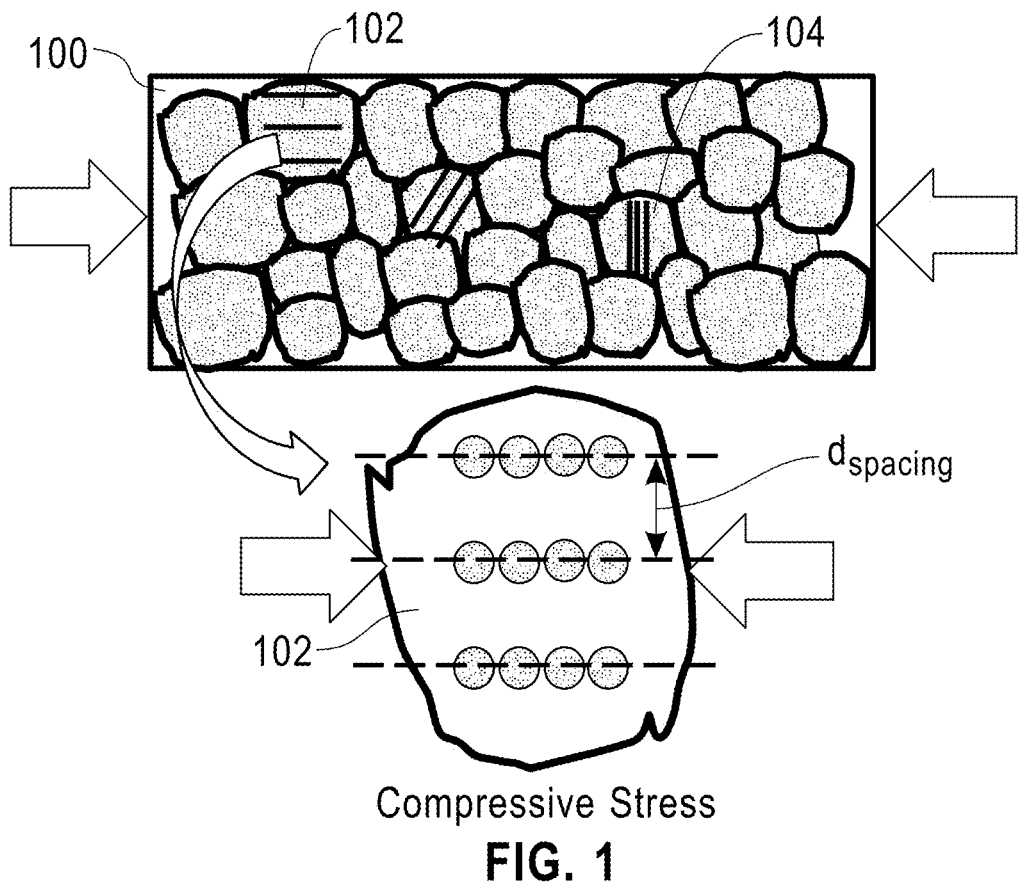
FIG. 1 is a diagram illustrating an example of a material undergoing compressive stress.
Figure 2:
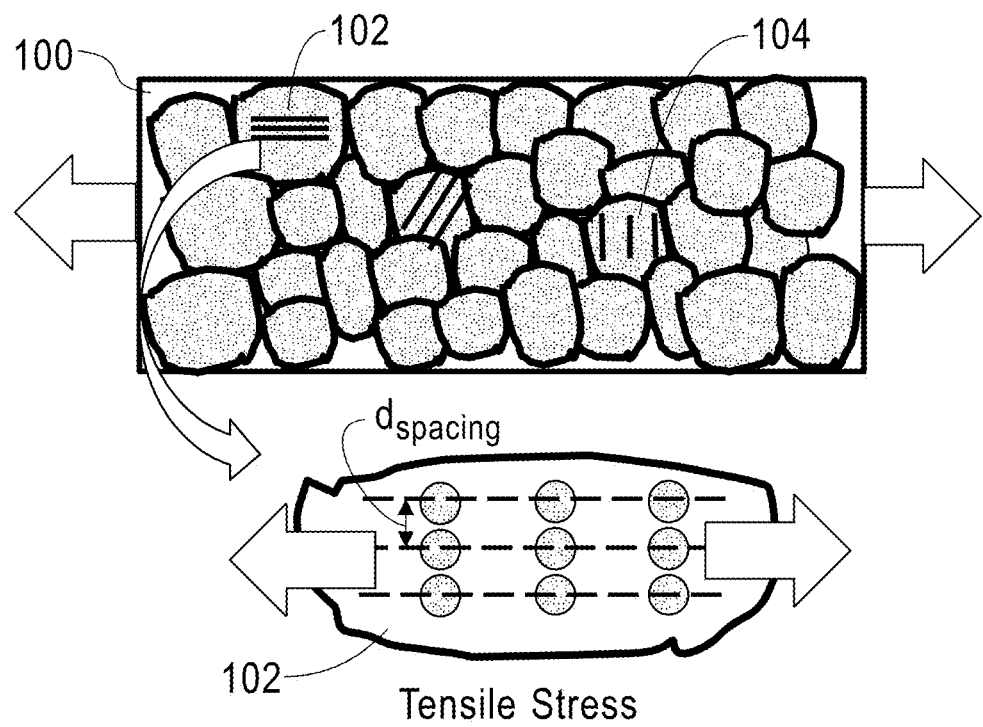
FIG. 2 is a diagram illustrating an example of a material undergoing tensile stress.

With reference now to FIG. 1, an example of a polycrystalline material 100 experiencing a compressive residual stress is illustrated. Residual stresses are defined as stresses that remain in the material following processing. They are elastic in nature and do not result in any permanent deformation/change to the material. In the case of compressive residual stresses, for example, as seen in FIG. 1, the spacing between atomic planes of crystallites, in the direction of application of force, as indicated in 102 is decreased and at the same time the vertical spacing between the atomic planes is increased. The spacing between atomic planes is also denoted as $d_{spacing}$. With reference now to FIG. 2, material 100 experiencing a tensile residual stress is illustrated. In the case of tensile residual stresses, for example, as seen in FIG. 2, the spacing between atomic planes of crystallites, in the direction of application of force, as indicated in 102 is increased and at the same time the vertical spacing between the atomic planes is decreased.

Figure 3:
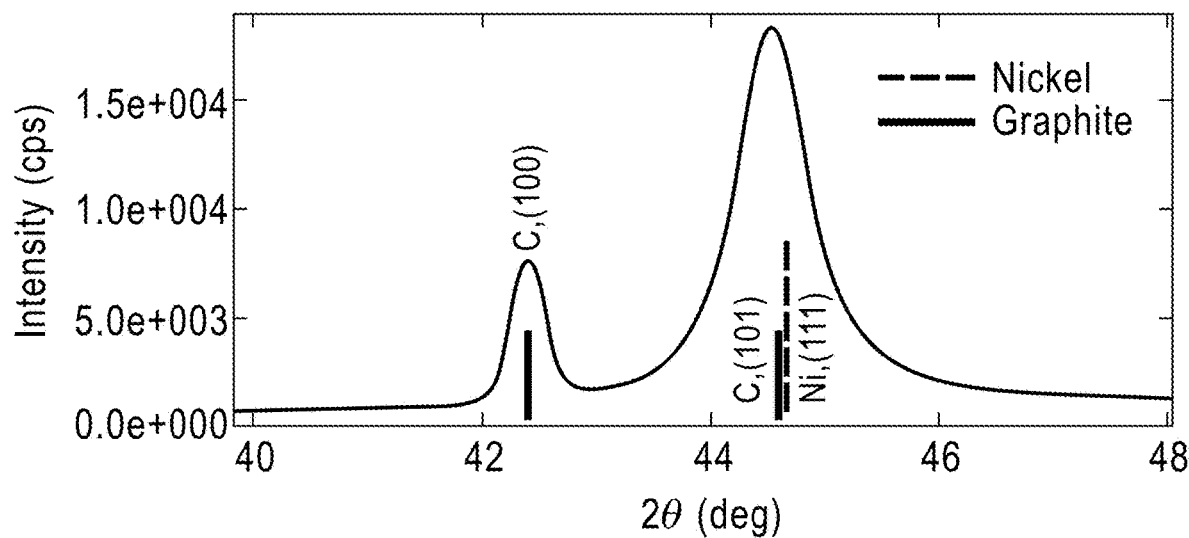
FIG. 3 is a plot of intensity vs. Two Theta angle showing an overlap of diffraction peaks between a Nickel thin film material and a substrate of a sample when a Two Theta-Omega scan (non-grazing type scan) is used. This scan type is utilized in the traditional $\sin^2 \psi$ stress technique and has limited control over penetration depth of X-rays.
Figure 5A:
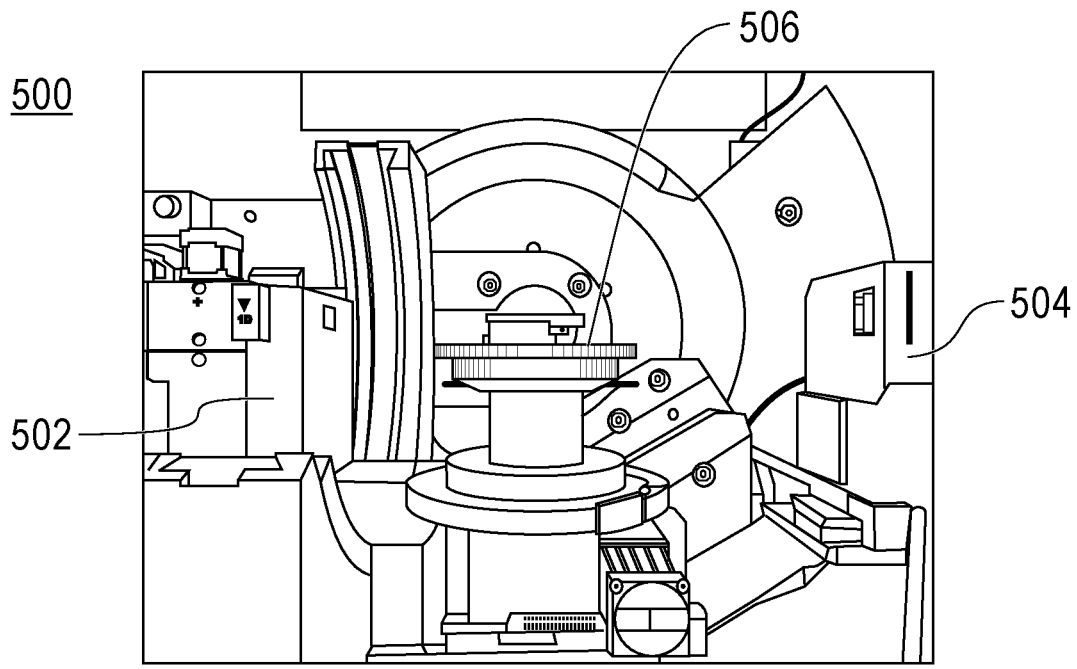
FIG. 5a is an image of a testing apparatus in accordance with some aspects of the present disclosure.

Residual stresses may be measured in a non-destructive fashion using X-ray diffraction. One common technique is the traditional $\sin^2 \psi$ technique. The changes in the spacing between atomic planes ($d_{spacing}$) of a high angle (e.g., Two-Theta) reflection may be plotted against $\sin^2 \psi$, where, $\psi$ describes the angular motion of the sample (sample tilt). The radius of the circle formed by the $\psi$ motion is perpendicular to the radius of circle created by the angular motion of the source and detector. This $\psi$ motion is also shown in FIG. 5A, where the sample stays flat when $\psi$ equals 0 degrees, and in FIG. 6 the same sample is at a tilted position and in this case $\psi$ equals 45 degrees. The residual stress may be calculated from the slope of the plot using elastic constants (e.g., Young's Modulus and Poisson's ratio). The traditional $\sin^2 \psi$ technique may be applied to measure residual stresses in bulk materials or in the case of thin film materials/coatings where there is no overlap between reflections or diffraction peaks from the thin film material and substrate or other underlying layers. However the traditional $\sin^2 \psi$ technique incapable of precisely measuring residual stresses present near the surface or subsurface regions in bulk materials. In the case of thin film materials/coatings, the traditional $\sin^2 \psi$ technique may be incapable of precisely measuring residual stresses in the thin film material when there is an overlap between reflections or diffraction peaks of the thin film material and the substrate. For example, the $\sin^2 \psi$ technique completely fails when analyzing residual stresses in the case of metallic thin film materials deposited on carbon based substrates, e.g., nickel deposited on graphite or other similar materials, due to extensive interference between reflections from both the Nickel thin film material and the carbon based substrate as shown, for example, in FIG. 3. As seen in FIG. 3, for example, the nickel and graphite diffraction peaks occur at approximately the same Two Theta values. Because of this, it may be hard to separate the reflections or signals received from the Nickel thin film material from the reflections or signals received from the substrate using the traditional $\sin^2 \psi$ technique and therefore to determine the residual stresses of the Nickel thin film material.

Figure 4:
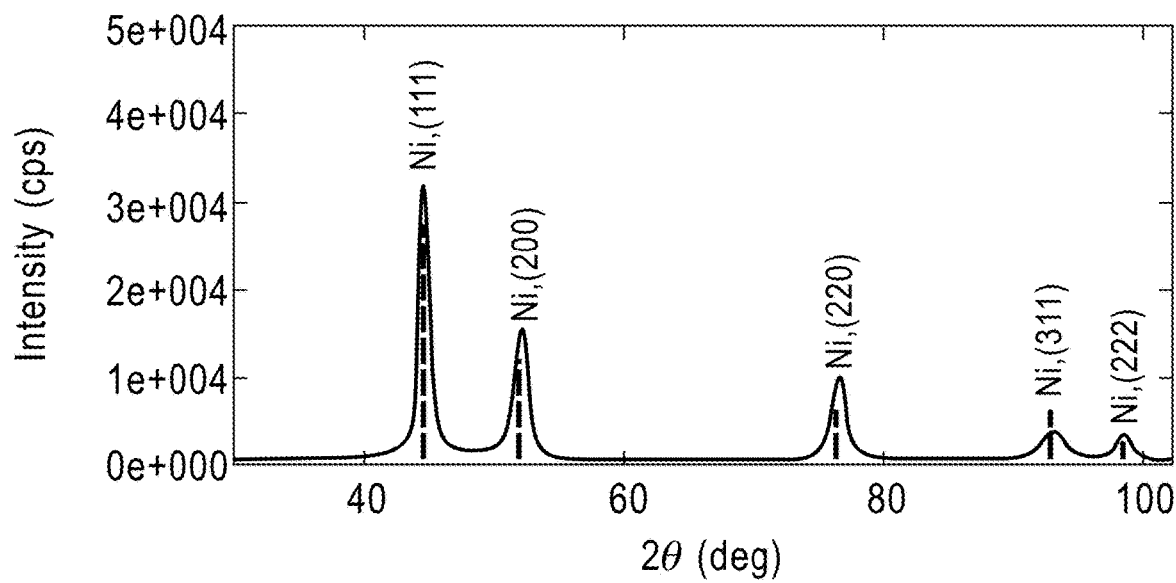
FIG. 4 is a plot of intensity vs. Two Theta angle showing only diffraction peaks of a Nickel thin film material as measured by a grazing incidence diffraction technique in accordance with some aspects of the present disclosure.

One approach to avoid reflections or signals from the substrate, or underneath layers in the case of multiple stack films, may include the use of a Grazing Incidence Diffraction technique. In the Grazing Incidence Diffraction technique, the X-ray beam may be applied to the sample at a shallow angle with respect to the sample surface. Due to the shallow angle, the X-ray beam may not penetrate deeply into the sample and instead the X-ray beam may only reflect from the top layer of the sample to be captured by the detector. At higher grazing incident angles, however, significant peak overlap between reflections from the substrate and the film may be present and may require the use of dedicated hardware to minimize overlap. An example of a Grazing Incidence Diffraction result on the nickel coated graphite system is illustrated in FIG. 4. As can be seen in FIG. 4, for example, only the diffraction peaks associated with the nickel coating are present in the Diffractogram.

Disclosed herein is a high resolution grazing incidence X-ray diffraction technique for measuring residual stresses and their gradients as a function of depth in thin films/coatings (e.g., be a metal, polymer, ceramic, oxide, organic, or other thin films/coatings) that has been deposited, grown naturally, or produced in any other manner on a substrate/carrier. This technique may be applied to bulk materials as well. In the case of bulk materials this technique may provide some advantages for quantifying surface residual stresses near the surface of the bulk material or near boundaries of the bulk material layers that may be introduced by processes such as shot peening, cutting, surface polishing, etching, ion implantation, etc. As used herein, the term material may encompass both thin film materials deposited, grown, or produced in any other manner on substrates and bulk materials.

Testing Apparatus

Figure 5B:
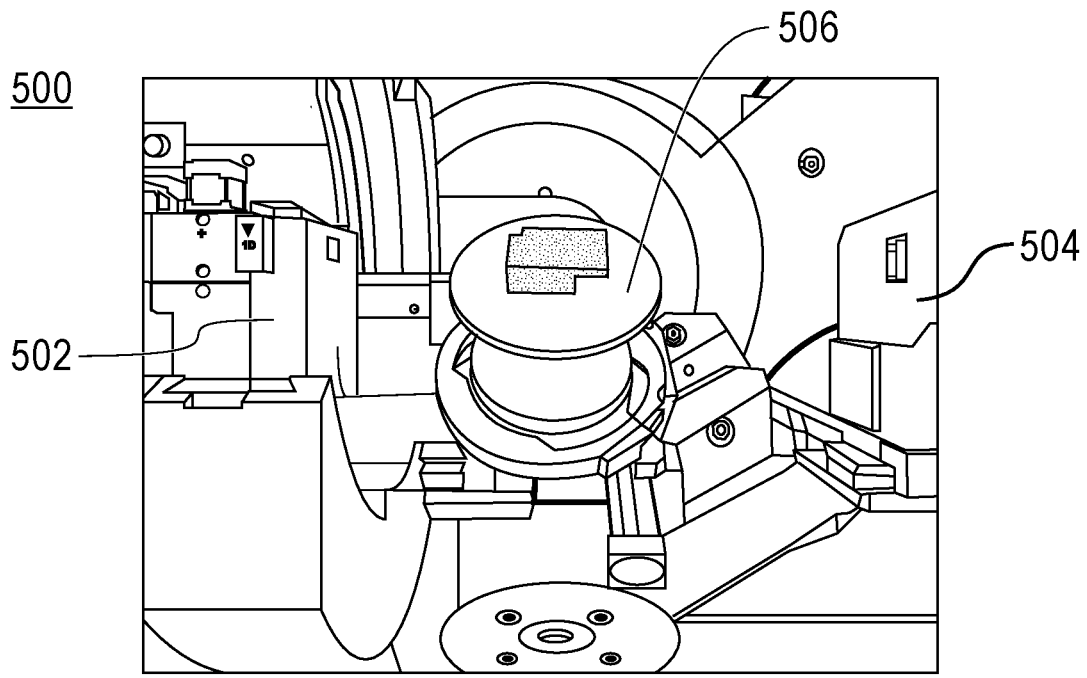
FIG. 5b is another image of the testing apparatus of FIG. 5a in accordance with some aspects of the present disclosure.
Figure 8:
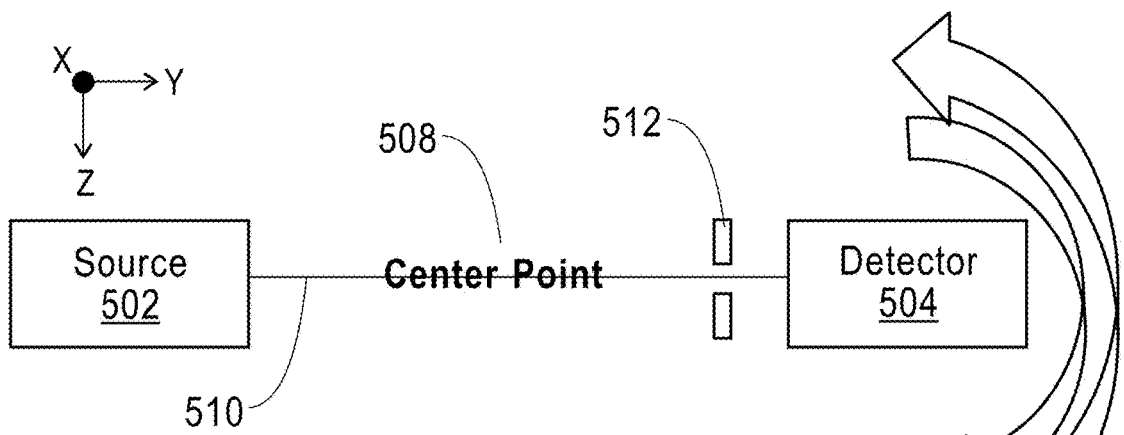
FIGS. 8-13 are diagrams illustrating some aspects of the calibration method of FIG. 7 in accordance with some aspects of the present disclosure.

With reference now to FIGS. 5a and 5b, an example testing apparatus 500 for measuring and analyzing residual stresses using the High Resolution Grazing Incidence X-ray Diffraction technique is illustrated. Testing apparatus 500 includes a source 502, a detector 504, and a stage 506. Testing apparatus 500 may utilize a Theta-Theta or vertical goniometer configuration. In this configuration source 502 and detector 504 may be configured to move in an angular fashion relative to center point 508 (FIG. 8) of testing apparatus 500. For example, an angle between source 502 and stage 506 or center point 508 (FIG. 8) may be created by moving the source in an angular fashion. Likewise, an angle between detector 504 and stage 506 or center point 508 (FIG. 8) may be created by moving the detector in an angular fashion. In some aspects, source 502 and detector 504 may physically translate, rotate, or move to adjust the angle between source 502 and stage 506 or center point 508 (FIG. 8) and between detector 504 and stage 506 or center point 508 (FIG. 8). In some aspects, stage 506 may be fixed in position, orientation, or both. In some aspects, stage 506 may be physically translated, rotated, or moved relative to source 502 and detector 504, as illustrated, for example, in FIG. 5b. In some aspects, for example, one or both of source 502 and detector 504 may be fixed in position, orientation, or both relative to the location of stage 506 or center point 508 (FIG. 8).

In some aspects, testing apparatus 500 may be or include a goniometer, an X-ray diffractometer, or both. For example, testing apparatus 500 may be configured to precisely measure the angles between source 502, detector 504, stage 506, and center point 508 during X-ray testing. In some aspects, testing apparatus 500 may include an X-ray diffractometer with a rotating anode, microfocus rotating anode, a sealed tube, microfocus X-ray source, or other similar hardware.

Figure 6:
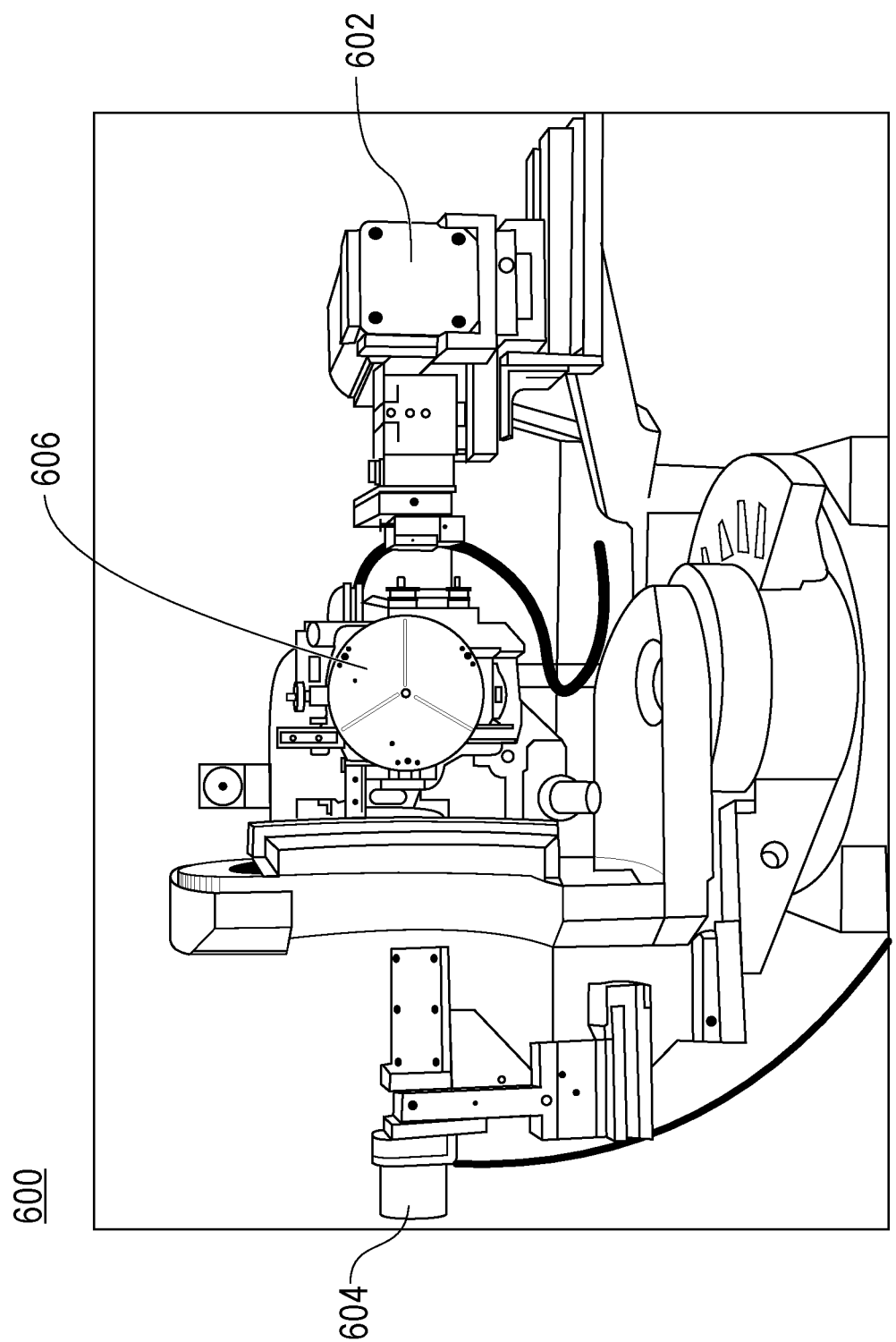
FIG. 6 is an image of an alternative testing apparatus in accordance with some aspects of the present disclosure.
Figure 19:
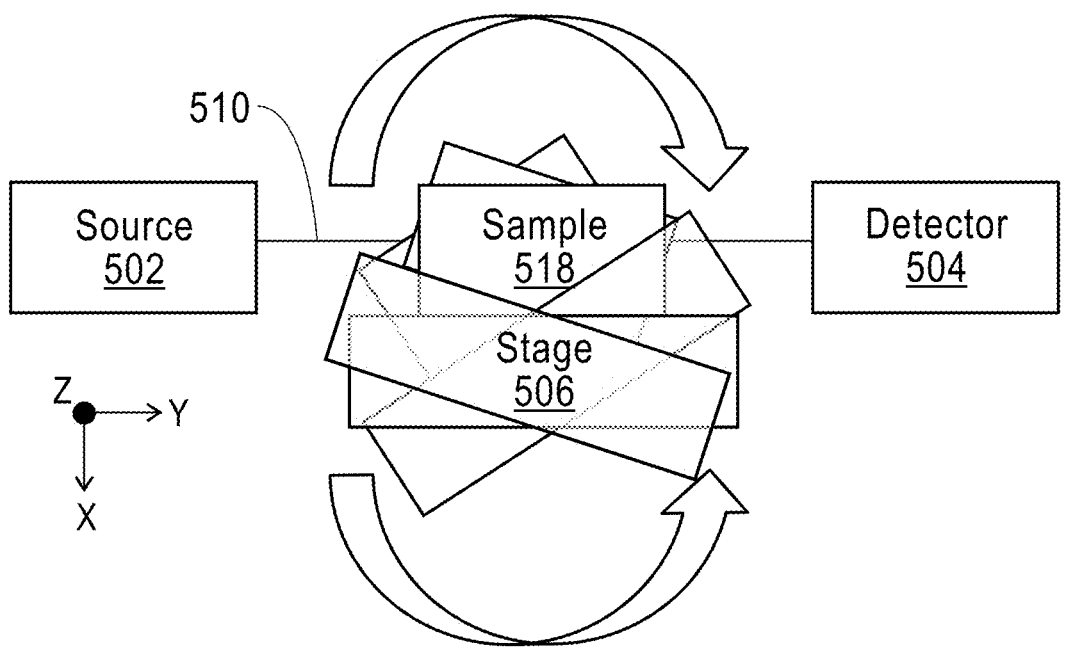
FIG. 19 is a diagram illustrating the rocking of a sample to determine an Omega offset when using a Theta-Two Theta/Horizontal Goniometer Diffractometer according to a portion of the method of FIG. 16.

Another form of test apparatus that may utilized for the High Resolution Grazing Incidence X-ray Diffraction technique is a Theta-Two Theta or Horizontal Goniometer diffractometer, as illustrated, for example, in FIG. 6. Testing apparatus 600 includes a source 602, a detector 604, and a stage 606. In this case, for example, as illustrated in FIG. 19, an angle between source 602 and stage 606 or a center point 508 (FIG. 8) of testing apparatus 600 may be created by moving the stage in an angular fashion. Likewise, an angle between detector 604 and stage 606 or center point 508 (FIG. 8) may be created by moving the detector in an angular fashion. In some aspects, source 602 and detector 604 may physically translate, rotate, or move to adjust the angle between source 602 and stage 606 or center point 508 (FIG. 8) and between detector 604 and stage 606 or center point 508 (FIG. 8). In some aspects, stage 606 may be fixed in position, orientation, or both. In some aspects, stage 606 may be physically translated, rotated, or moved relative to source 602 and detector 604.

Another form of test apparatus that may be utilized for the High Resolution Grazing Incidence X-ray Diffraction technique is a Theta-Two Theta configuration diffractometer using a Vertical Goniometer.

Another form of test apparatus that may be utilized for the High Resolution Grazing Incidence X-ray Diffraction technique is an diffractometer where the stage can be moved up or down vertically in a controlled fashion in order to maintain a constant or variable distance between sample and detector.

Another form of test apparatus that may be utilized for the High Resolution Grazing Incidence X-ray Diffraction technique is a grazing incidence bench top style compact diffractometer where the source is fixed at a shallow incidence angle or has limited motion. The detector may move in an angular fashion or may remain fixed or may have restricted motion.

Another form of test apparatus that may be utilized for the High Resolution Grazing Incidence X-ray Diffraction technique is a diffractometer where multiple or single X-ray producing sources and/or detectors are used.

While described herein with reference to source 502, detector 504, and stage 506 of testing apparatus 500, any of the above mentioned testing apparatus may be utilized to perform the High Resolution Grazing Incidence X-ray Diffraction technique.

Source 502 may be any device that is configured to produce or supply electromagnetic radiation or beam 510 (FIG. 8) toward stage 506 and detector 504. For example, source 502 may be configured to produce or supply an X-ray beam. An example source 502 may include, for example, a Sealed X-ray Tube, Rotating anode, microfocus X-ray tube, microfocus rotating anode, or other similar X-ray sources, utilizing single or multiple solid targets (liquid or solid or both) to produce X-rays of desired wavelength/wavelengths.

Detector 502 may be any device that is configured to sense an intensity of electromagnetic radiation, e.g., beam 510 (FIG. 8), received either directly from source 502 or indirectly from source 502 via a sample positioned or attached to stage 506, e.g., due to reflection, refraction, diffraction, or other similar radiation from the sample. In some aspects, for example, detector 502 may be gas based or a scintillator or silicon strip/semiconductor based or may use any other technology which is configured to measure the intensity of an X-ray beam. In some aspects, detector 504 may be a 2D, 1D, or 0D X-ray detector. In some aspects, detector 504 may be a combined 1D/0D detector. In some aspects, detector 504 may be a combined 2D/1D/0D detector. The detectors may or may not have energy discrimination capability. An example detector 504 may include, e.g. Scintillation detectors (e.g., offered by Bruker AXS, Panalytical, Rigaku or other vendors), Pacel® (offered by Panalytical), X'Celerator® (offered by Panalytical), Vantec™ (offered by Bruker AXS), LynxEye™/LynxEye XE™ (offered by Bruker AXS), D/Tex™ (offered by Rigaku), Hypix® 3000 (offered by Rigaku), etc.

In some aspects, the different kinds of testing apparatus described above may include additional components, for example, source side or primary optics. Some of the components may include an X-ray mirror or mirrors, polycapillary optics, or collimators that provides an X-ray beam that is either parallel, pseudo parallel, or focusing in point/Line form. In some aspects, the testing apparatus may include multiple or single mirror exit slits, masks, pinholes, or collimators that may be utilized to control the width, height, and shape of the X-ray beam hitting the sample. For example, the mirror exit slit may be a 0.2 mm slit. As another example, the mirror exit slit may be a 0.1 mm pinhole slit. In some aspects, the mirror exit slit may be changed or swapped out, e.g., exchanging the 1 mm slit for the 0.1 mm slit, to control the spread of the X-ray beam on the sample and determine what portion of the sample should contribute to the stress analysis.

In some aspects, the testing apparatus may include a cradle having multiple axes of freedom such as, e.g., a Chi axis of freedom (sample tilt), Phi axis of freedom (sample rotation), or other axes of freedom.

In some aspects, the testing apparatus may include a Hexapod stage or its variants where parallel-kinematic micro positioning systems are used to create axes of freedom such as, e.g., a Chi axis of freedom (sample tilt), Phi axis of freedom (sample rotation), or other axes of freedom.

In some aspects, testing apparatus may include use of axial soller/sollers that may be used to control the divergence of the X-ray beam in the axial direction, e.g., perpendicular to the direction of propagation of the X-ray beam in the plane of the paper. In some aspects, for example, the axial soller may range from 0.05 degrees to a few degrees.

In some aspects, testing apparatus may include an equatorial soller that defines the Two Theta of the diffracted beam precisely and separates out reflections from thin film material and substrate. In some aspects, the equatorial soller may range from 0.05 degrees to a few degrees, e.g., 1, 2, 3, or more degrees or any other degree value. In some aspects, a cross soller may be utilized, as it acts as an equatorial as well as an axial soller.

In some aspects, testing apparatus may include a scintillation detector. In some aspects the testing apparatus may include either a 2D, 1D, or 0D X-ray detector. In some aspects the testing apparatus may include combined 1D/0D detector. In some aspects the testing apparatus may include a combined 0D/1D/2D detector.

Apparatus Calibration

Figure 9:
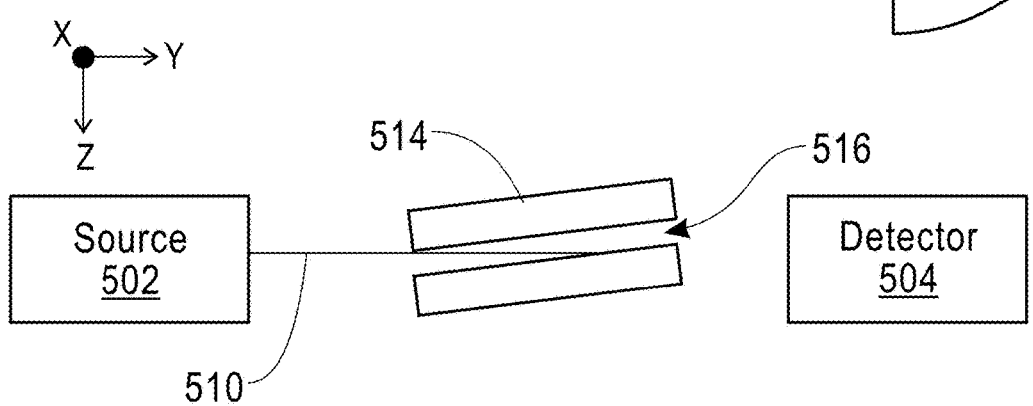
Figure 10:
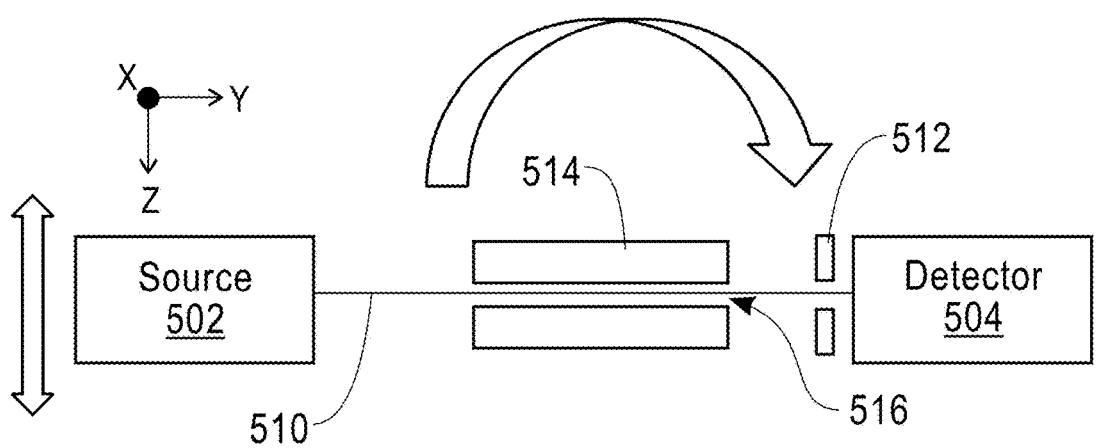
Figure 11:
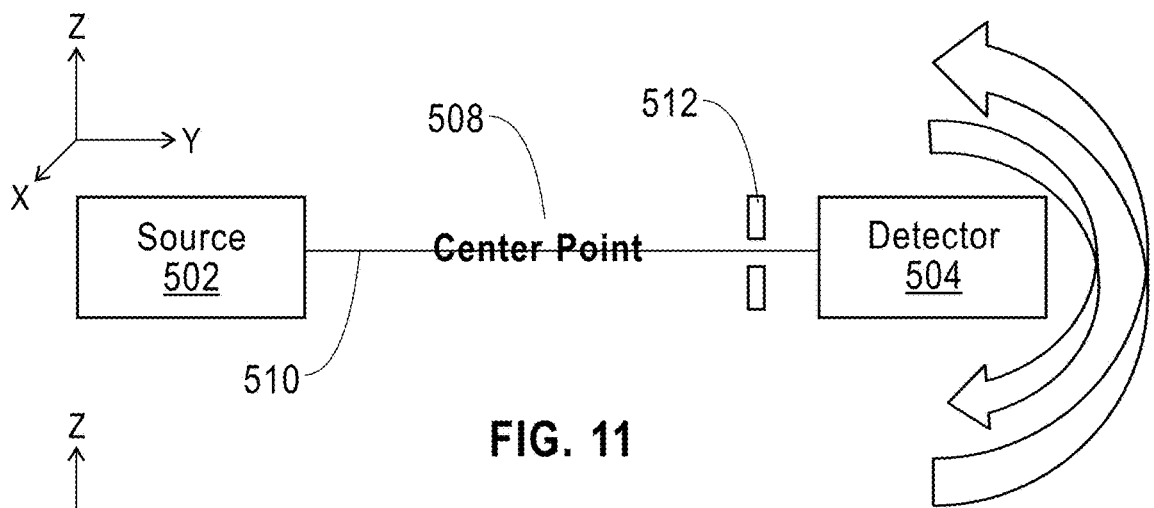
Figure 12:
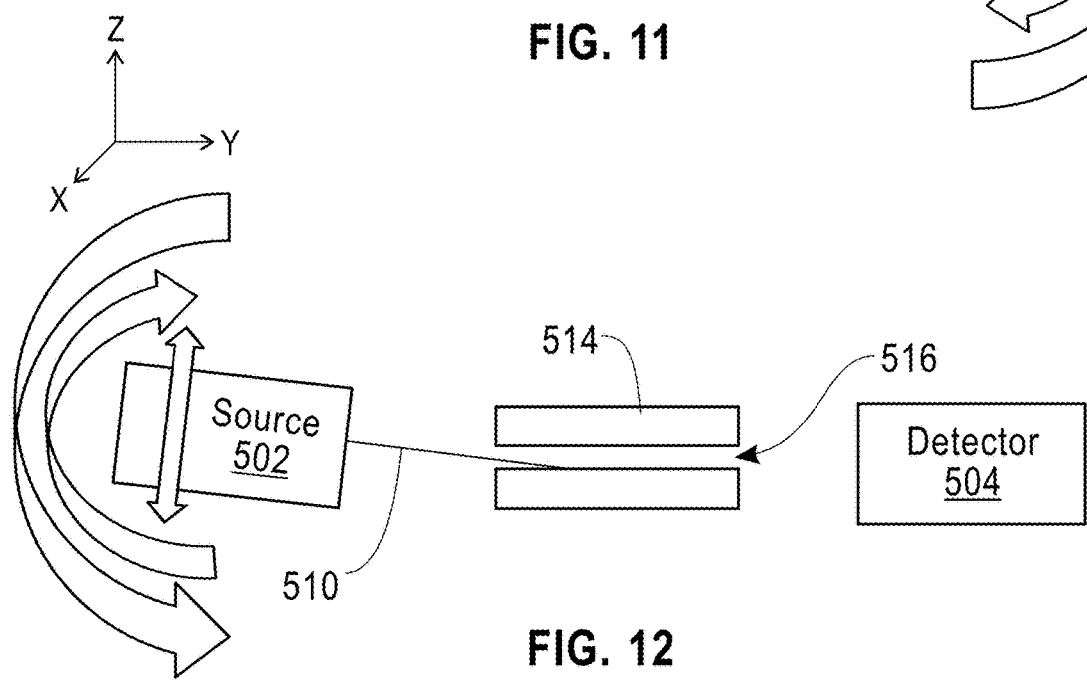
Figure 13:
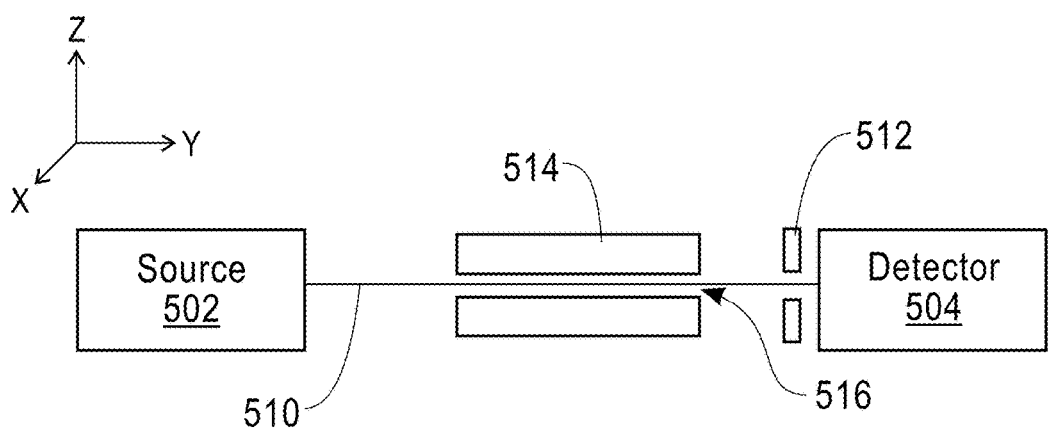

With reference now to FIGS. 5a, 5b, and 6-14, testing apparatus may be calibrated or aligned prior to testing of a sample. In some aspects, for example, testing apparatus may be calibrated using common industry practices. In some aspects, for example, testing apparatus may be calibrated using inputs from a vendor. In FIGS. 8-10, X, Y, and Z axes are illustrated with the Z axis extending out of the page perpendicular to the X and Y axes. In FIGS. 11-13, X, Y, and Z axes are illustrated with the X axis extending out of the page perpendicular to the Y and Z axes.

At 702, prior to positioning a sample on stage 506, the center point 508 of testing apparatus 500 may be determined. In some aspects, for example, the center point 508 may be determined by positioning an alignment fixture (not shown) on stage 506 and camera/scope/video camera/visual device to observe motion of fixture, a laser, or any other method provided by a manufacturer of the stage 506 or other components of testing apparatus. In addition a level or a similar device may be used to ensure that the stage is perfectly flat at ψ=0 degrees. In some aspects, the Chi (sample tilt) and the Phi (sample rotation) axes of the stage should exhibit little or no wobble and should be within manufacturer specifications.

At 704, source 502 and/or primary optics may be calibrated to ensure that a parallel/pseudo parallel beam 510 with a desired wavelength in the form of a spot or line beam. For example, the source 502 and/or primary optics may be configured to produce a focusing X-ray beam having a desired X-ray form, shape, focus, wavelength, intensity, or other similar parameters. In some aspects, the desired wavelength may be determined based on the sample composition. For example, in the case of residual stress measurements on Copper films, Copper K alpha radiation may be used. However the same radiation type may not be ideally suited for analyzing residual stresses in Cobalt films due to fluorescence effects since the Copper radiation causes the sample to act as a secondary source of X-rays, thereby drastically lowering the peak to background for the Cobalt diffraction peaks.

At 706, a slit 512 may be placed in front of detector 504. For example, a 0.05 mm slit 512 may be placed in front of detector 504. The slit sizes can range from 0.01 mm to a few mm. The slit may be configured to receive the x-ray beam.

At 708, the source and detector alignment may be checked to determine whether they are in or approximately in a straight line, e.g., not positioned at an angle with respect to each other, and parallel or approximately parallel to the ground. This may occur when source and detector are positioned close to zero degree positions as shown, for example, in FIG. 8. A detector scan may be performed by moving or rocking the detector 504 a few degrees (for example, −5 to 5 degrees) relative to the zero position, e.g., angular motion. In some aspects, nothing should be placed between source 502 and detector 504. During the detector scan, detector 504 may detect changes in intensity values from the received beam 510 by moving between −5 and 5 degrees.

At 710, a Gaussian center of the detected changes in intensity values from the received beam 510 during the detector scan may be defined or re-defined as a zero position for the axes of detector 504. The detector 504 may be calibrated based on the defined zero position such that a 0 degree marking for the detector 504 is the defined zero position.

At 712, an alignment fixture 514, e.g., as illustrated in FIGS. 9, 10, and 12 and 13, may be positioned at the center point 508 of the testing apparatus 500, e.g., on the stage 506. Alignment fixture 514 may include a pathway 516, e.g., a slot, channel, hole, or other similar feature, that extends through alignment fixture 514 and is configured to receive the beam 510 there through when properly aligned.

At 713, a slit in front of the detector may be removed or the detector slit size may be limited, e.g., to 3 mm or another value.

At 714, the source and/or primary optics may also need to be translated a few mm relative to center point to check and ensure if the beam is going through the center point. A fluorescent screen jig or similar fixture (not shown) may be used for this part of the procedure. Following translation, with reference to FIG. 8-10, since source 502 may be fixed, the alignment fixture 514 needs to be rocked, e.g., rotated about the center point 508 between −5 and 5 degrees or other similar values, relative to source 502 while source 502 supplies beam 510 toward detector 504. In some aspects, with reference to FIG. 11-13, for example, the stage 506 and alignment fixture 514 may be fixed and source 502 may instead be physically rocked or rotated, e.g., between −5 and 5 degrees. These scans are termed as Theta-Theta Omega/source scans or Theta-Two Theta rocking curve scans, depending on the set up of the apparatus. As seen in FIGS. 9, 10, 12, and 13, during rocking, the beam 510 only reaches detector 504 when the pathway 516 is aligned or partially aligned with the source 502 and detector 504 such that some or all of beam 510 travels through the pathway 516.

Figure 14:
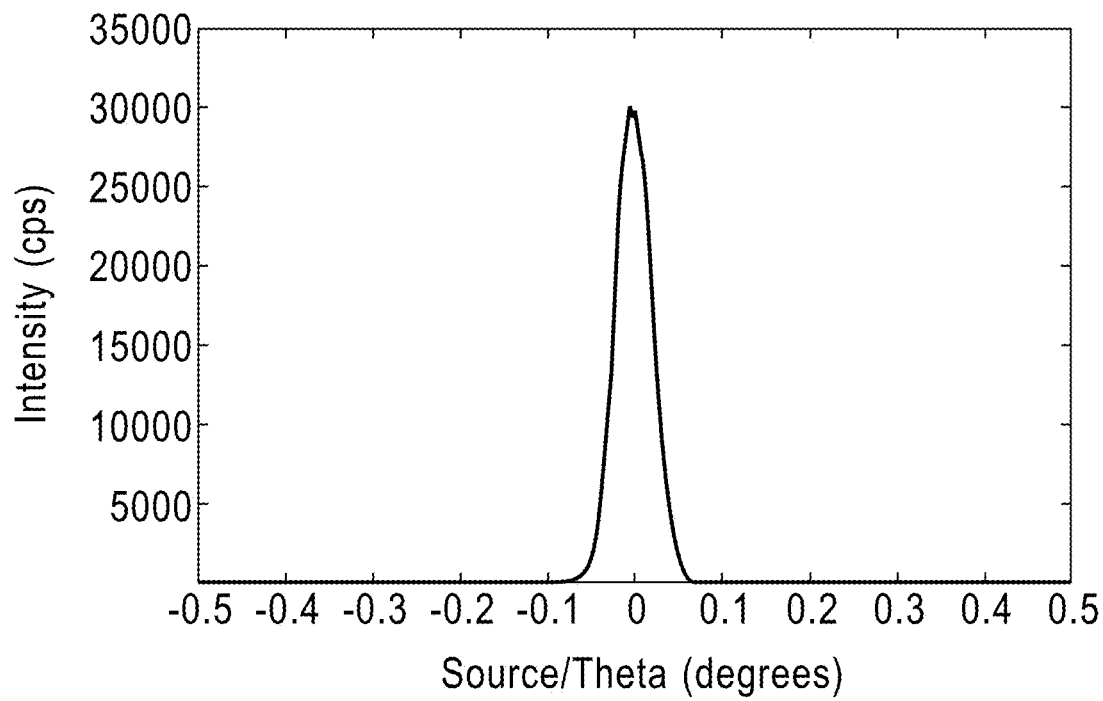
FIG. 14 is a plot showing an example of a recording of X-ray photon intensity coming from angular measurement of source/Omega/theta, as recorded by a detector, during calibration in accordance with some aspects of the present disclosure.

With reference now to FIG. 14, an example output measurement by detector 504 from the rocking of alignment fixture is illustrated. As seen in FIG. 14, as the alignment fixture is rocked between −0.5 and 0.5 degrees, an intensity of the beam 510 forms a bell shaped curve due to the alignment fixture 514 blocking or inhibiting some or all of the beam 510 from reaching detector 504. For example, the highest detected intensity level may correspond to the position of alignment fixture where pathway 516 is fully aligned between source 502 and detector 504 such that the beam 510 may pass directly through pathway 516 to reach detector 504.

Figure 7:
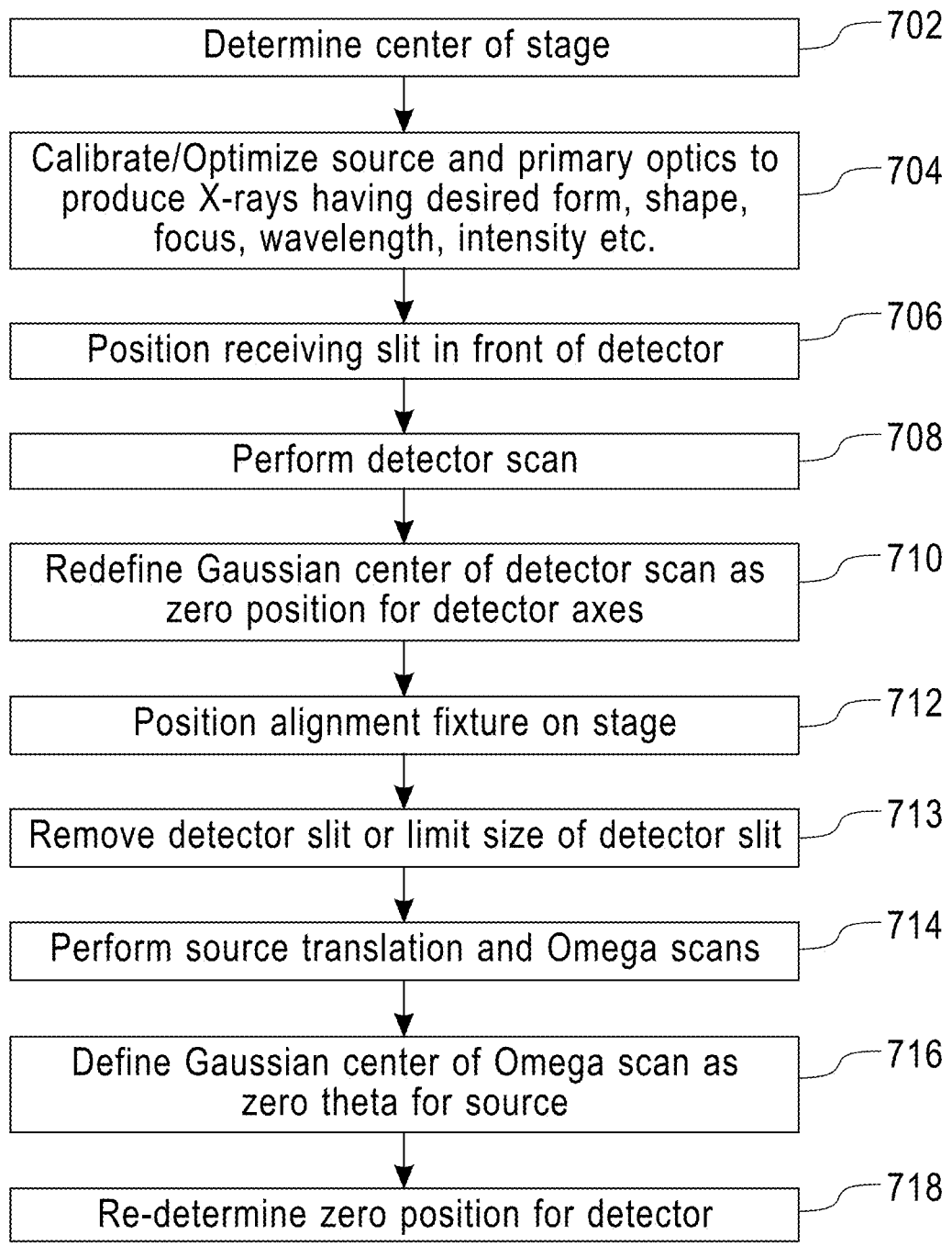
FIG. 7 is a flow chart of a method for calibrating the testing apparatus using a Theta-Two Theta (Horizontal Goniometer) or Theta-Theta (Vertical Goniometer) diffractometer (FIGS. 5a, 5b, and 6) in accordance with some aspects of the present disclosure.

At 716, referring to FIGS. 7 and 14, the Gaussian center of the detector output illustrated in FIG. 14 may be determined and the Theta axes (created by either stage or source motion) may be calibrated to set the determined Gaussian center to zero degrees to ensure that the beam 510 goes through the center point 508.

At 718, slit 512 may once again be inserted in front of detector 504 and a detector scan may be run to re-determine the zero position of the detector 504 in the manner described above at 706-710.

In some aspects, following step 718, Omega scans or rocking curve measurements may be carried out a pre-determined number of times to determine precision in the source or stage motion respectively. In some aspects, a desired precision may be a precision better than 0.005 degrees. For example, in some aspects, 200-300 times or more Omega scans may be generated, in order to create the necessary set of data points for statistical error analysis. Any other number of times may be used. In some aspects, similar measurements may be carried out for the detector axes, using procedure described in step 718, in order to determine its precision.

Testing apparatus 500 is now calibrated for testing. In some aspects, testing apparatus 500 may be calibrated periodically, e.g., annually, quarterly, monthly, weekly, daily, before testing a batch of samples, or before the testing each sample.

High Resolution Grazing Incidence X-ray Diffraction Technique

Figure 15:
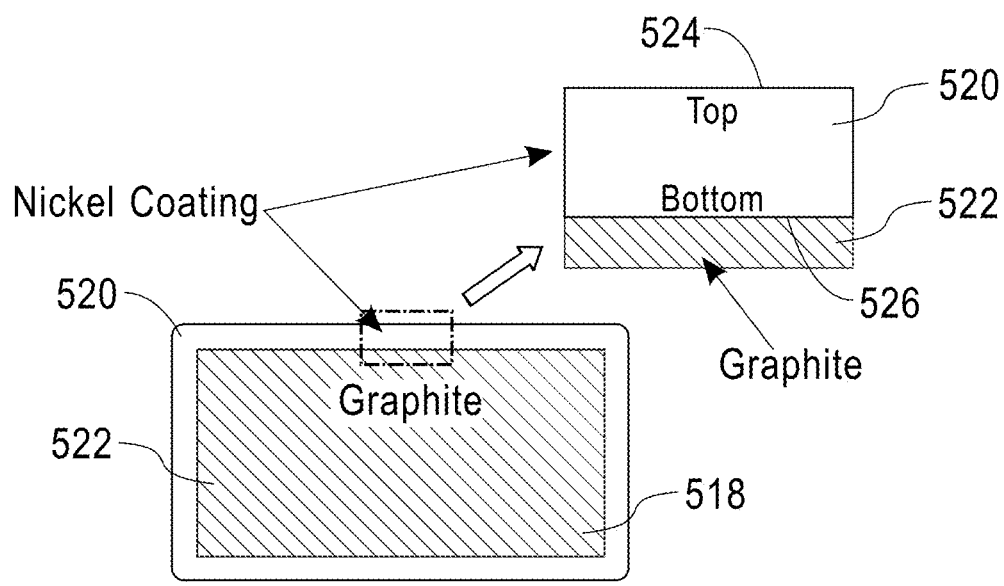
FIG. 15 is an example of a sample in accordance with some aspects of the present disclosure.
Figure 16:
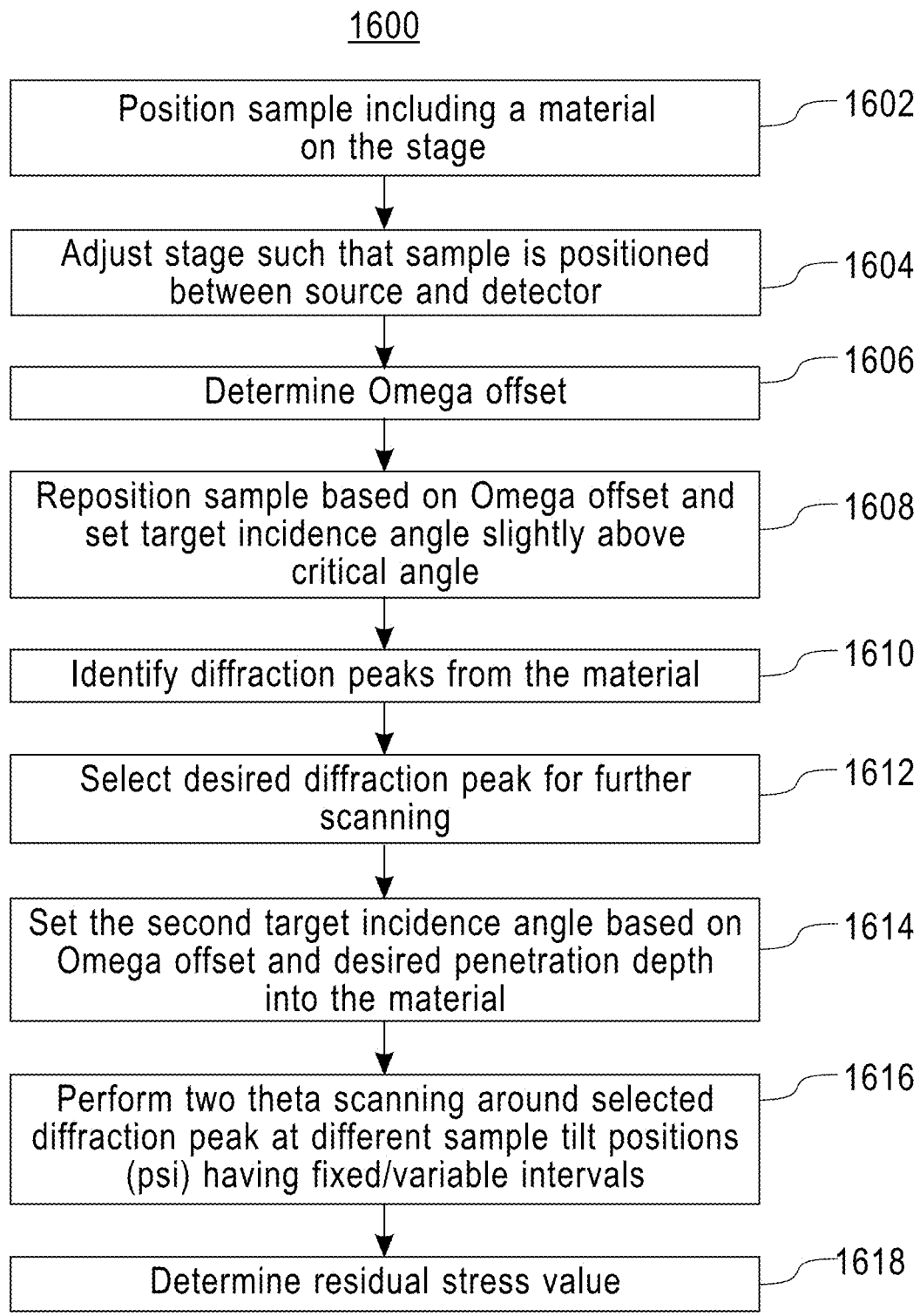
FIG. 16 is a flow chart of a method for performing high resolution grazing incidence X-ray diffraction in accordance with some aspects of the present disclosure.
Figure 17:
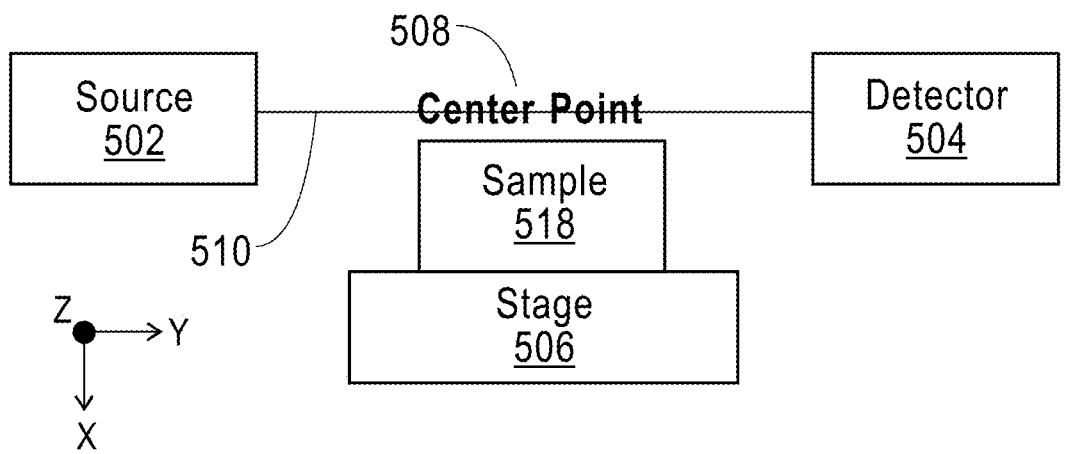
FIGS. 17 and 18 are diagrams illustrating the positioning in accordance with the method of FIG. 16.
Figure 18:
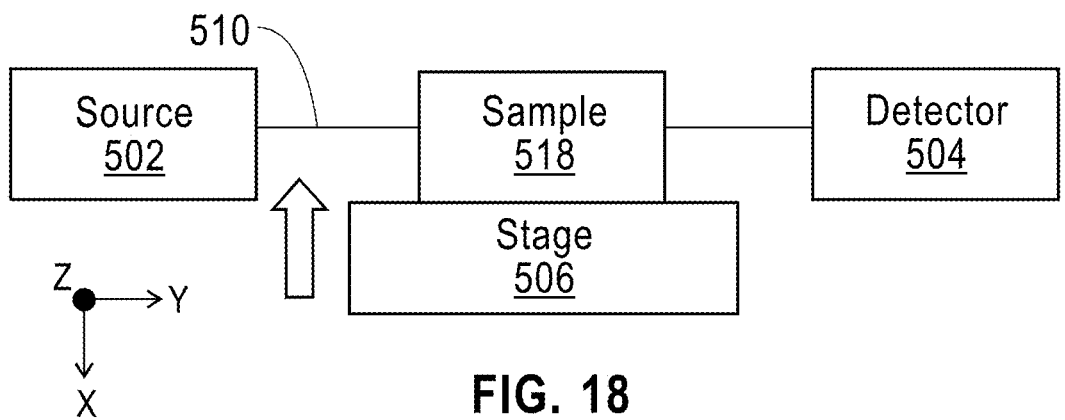

Once the testing apparatus 500 is calibrated, the high resolution grazing incidence X-ray diffraction technique may be performed on a sample 518 with reference now to FIGS. 15-23. In FIGS. 17-19, X, Y, and Z axes are illustrated with the Z axis extending out of the page towards the reader and is perpendicular to the X and Y axes.

FIG. 15 illustrates an example sample 518 to be tested using the high resolution grazing incidence X-ray diffraction technique, in this case, a nickel coating on a graphite substrate is chosen. Sample 518 could be any thin film material/coating 520 (e.g., metal, polymer, ceramic, oxide, organic, etc.) that has been deposited, grown naturally, or produced in any other manner on the substrate 522. For example, the coating or thin film material 520 may be deposited on substrate 522 using, e.g., Thin Film Deposition or Electrodeposition or other well-known techniques. In some aspects, a thin film material may, for example, be a layer of material ranging from a few nanometers to several microns in thickness. Thin film material 520 includes a top surface 524 and a bottom surface 526 Other samples including the same or different thin film materials deposited on the same or different substrates may also be tested using the high resolution grazing incidence X-ray diffraction technique. In some aspects, sample 518 may alternatively include a bulk material. While described generally with reference to thin film material 520, the technique described herein may be utilized on both to samples including bulk materials and samples including thin film materials.

With reference now to FIG. 16, a method 1600 for performing high resolution grazing incidence X-ray diffraction on sample 518 including a material, e.g., a thin film deposited, grown, or produced in any other manner on a substrate or a bulk material, will now be disclosed.

Sample Positioning and Alignment

Figure 16A:
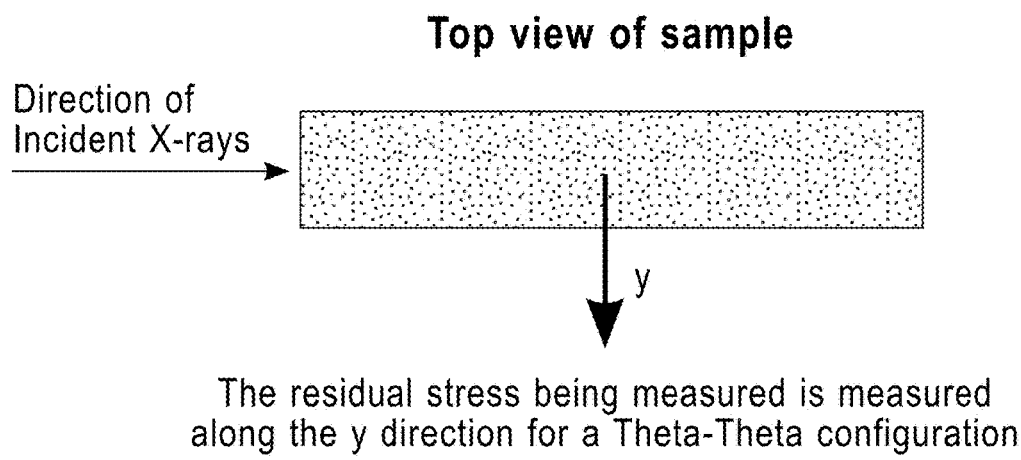
FIGS. 16a and 16b describe projection of the normal of stage/sample tilt (psi) on the sample surface.
Figure 16B:
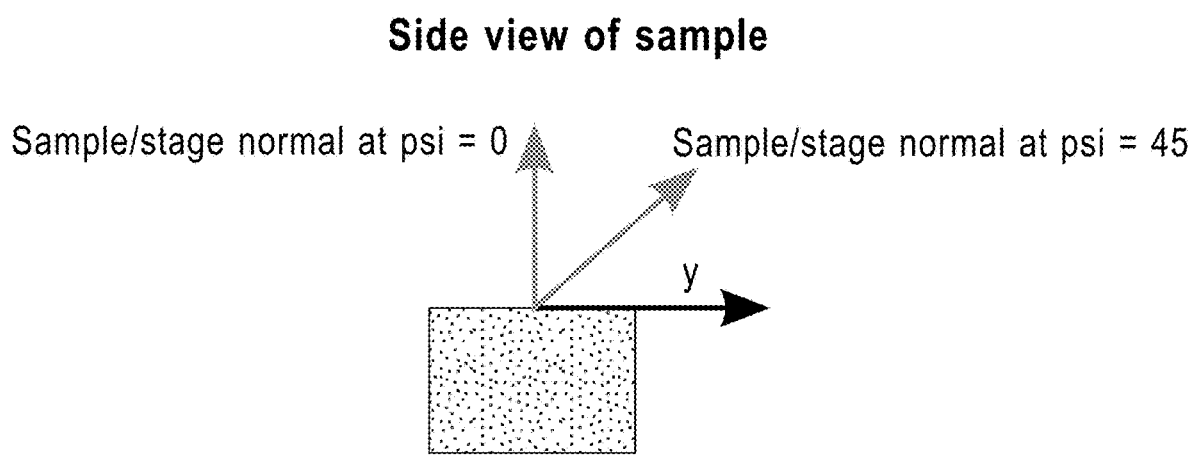

In some aspects, the sample may be positioned on the stage such that the direction of measurement of stress is parallel to the projection of the normal of stage/sample tilt (psi) on the sample surface, as shown, for example, in FIGS. 16a and 16b. FIG. 16a illustrates a top view of the sample showing the direction of the incident x-rays and the direction of the normal y which shows that the residual stress is measured along the y direction for a Theta-Theta configuration. FIG. 16b illustrates a side view of the sample, showing the sample stage normal at various psi values and the normal y. In some aspects, the desired direction of measurement may be adjusted by sample rotation or by manual means. In some instances stress measurements may be carried out along multiple directions on the same sample. In some aspects, a deviation from the above positioning of the sample may result in reduced accuracy of measurement or invalid results.

Alignment of sample 518 may affect the results of the High Resolution Grazing Incidence X-ray Diffraction measurements as the sample height and flatness of sample surface with respect to the Incident X-ray beam may impact the measurement accuracy and results.

At 1602, sample 518 may be positioned and aligned on stage 506 as illustrated, for example, in FIG. 17, and as described above. At 1604, stage 506 may be actuated or adjusted to position the sample 518 in between source 502 and detector 504 as illustrated, for example, in FIG. 18, where the source 502 and detector 504 are at zero degrees. In some aspects, sample 518 may be moved between source 502 and detector 504 such that sample 518 is positioned approximately halfway into beam 510, as illustrated, for example, in FIG. 18. For example, before the sample 518 is positioned between source 502 and detector 504, a photon intensity of the beam 510 as measured by the detector 504 may be, e.g., 100 k. As the sample 518 is moved into position between source 502 and detector 504, the photon intensity of the beam 510 as measured by detector 504 may be reduced. For example, when sample 518 is positioned approximately halfway into the beam 510, the photon intensity of the beam 510 as measured by the detector 504 may be reduced to, e.g., 50 k. This procedure may also be termed as sample height adjustment or Z scan.

In some aspects, the sample may be aligned by performing a Z scan (e.g., the sample height is adjusted to half of the intensity of the Primary X-ray beam), followed by a ψ scan from −5 to 5 degrees, following which the sample is moved to the Gaussian mid-point on the ψ scan. This helps to correct for sample tilts in the orthogonal direction to the X-ray beam 510. This is followed by a Z scan, rocking curve scan at Two Theta equals zero (e.g., the sample is either rocked in the Omega direction by rotating stage about center point or the source and detector are moved in order to carry create the rocking curve motion, depending on the test apparatus geometry), following which the stage or source (depending on the test apparatus) is moved to the Gaussian mid-point on the rocking curve scan. This is followed by another Z scan. If the mid-point values of Z scan (before and after rocking curve) differ by, e.g., 20%, the alignment procedure may be repeated at least one or more times. Other percentages of difference may also trigger a repeat of the alignment procedure.

In some aspects, the sample may be aligned by performing a Z scan (e.g., the sample height is adjusted to half of the intensity of the Primary X-ray beam), rocking curve scan at Two Theta equals zero (e.g., the sample is either rocked in the Omega direction by rotating stage about center point or the source and detector are moved in order to carry create the rocking curve motion, depending on the test apparatus geometry), following which the stage or source (depending on the test apparatus) is moved to the Gaussian mid-point on the rocking curve scan. This is followed by another Z scan. If the mid-point values of Z scan (before and after rocking curve) differ by 20%, the alignment procedure may be repeated at least one or more times. Other percentages of difference may also trigger a repeat of the alignment procedure.

In some aspects, the sample may be aligned by using manual and/or motorized adjustment of two orthogonal tilt angles. This may be present as an option on some stages or may be available as on add on option to existing stage. The sample may be aligned by performing a Z scan (e.g., the sample height is adjusted to half of the intensity of the Primary X-ray beam), followed by rocking curve scan using one of the orthogonal tilt axes (only the orthogonal tilt axis is moving in this case, source is fixed and detector is fixed). Followed by sample rotation (phi) to 90 degrees, where another orthogonal axis scan is carried out. This is followed by another Z scan. If the mid-point values of the orthogonal Z scans differ by 20%, the alignment procedure may be repeated at least one or more times. Other percentages of difference may also trigger a repeat of the alignment procedure.

Determining the Omega Offset

Figure 19A:
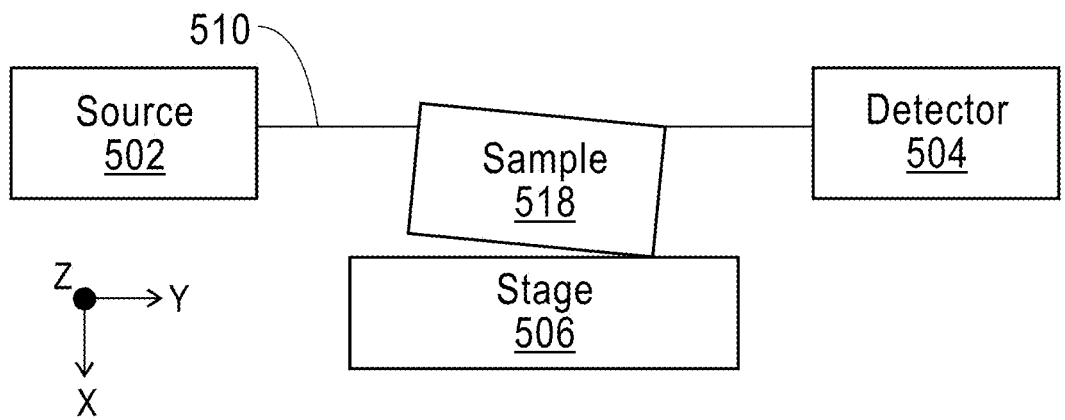
FIG. 19a is a diagram illustrating the effects of improper sample mounting for a Theta-Two Theta/Horizontal Goniometer Diffractometer.

At 1606, the Omega offset of the sample 518 is determined. The Omega offset is the angle from 0 degrees that the source must be adjusted for the sample 518 due to unintended sample tilt brought upon by non-uniform sample mounting or non-uniformity in stage machining or a combination of other factors, as shown, for example, in FIG. 19*a*.

The Omega offset may be determined by performing a rocking curve scan at Two Theta equals zero (e.g., the sample is either rocked in the Omega direction by rotating stage about center point or the source and detector are moved in order to carry create the rocking curve motion, depending on the test apparatus geometry), following which the stage or source (depending on the test apparatus) is moved to the Gaussian mid-point on the rocking curve scan. During the Omega scan, detector 504 measures the intensity of the beam 510 as it reflects off of sample 518. If the sample 520 were to be perfectly flat, the measurement by detector 504 will show a Gaussian center at 0 degrees for Omega. In this case, the Omega offset is 0. If, however, the sample was not flat, the Gaussian center of the intensity measurements by detector 504 may not be at 0 degrees for Omega. In this case, the Omega offset is determined to be the offset between 0 degrees and the Gaussian center of the intensity measurements. For example, if the Gaussian center of the intensity measurements is at 0.08 degrees, an Omega offset of 0.08 degrees may be determined. The determined Omega offset may be stored for later use, e.g., in memory of a computing device.

If the Omega value obtained during alignment is non-zero, the experimental Omega value used during the actual measurement needs to be changed. For example, if during alignment the Omega position is determined to be located around 0.08 degrees and the user wants to perform a high resolution grazing incidence X-ray diffraction scan at 0.5 degrees. The Omega drive for the measurement should be set to 0.5 degrees+0.08 degrees, e.g., 0.58 degrees, and not 0.5 degrees, to account for the Omega offset. In some instances the Omega offset may be as high as 1.5 degrees or more. In this case the Omega drive for the measurement should be set to 0.5 degrees+1.5 degrees, e.g., 2 degrees, and not 0.5 degrees, to account for the Omega offset. In some instances the offset may be −0.08 degrees or lower. In this case the Omega drive for the measurement should be set to 0.5 degrees+(−0.08) degrees, e.g., 0.42 degrees, and not 0.5 degrees, to account for the Omega offset. This adjustment may account for any sample tilts and sets the incident angle of the X-ray beam 510 accurately with respect to the sample surface. This adjustment ensures that the X-ray beam is penetrating into the sample at the desired incident angle used during the High resolution Grazing Incidence stress measurement.

Reposition Sample

At 1608, once the Omega scan is complete, the sample 518 may be repositioned such that the angle of sample 518 relative to the source 502 is equal to the target scan incident angle plus the Omega offset. The first target incidence angle is chosen such that it is slightly greater than the critical angle of the bulk material or thin film material. In some aspects, for example, slightly greater may be 0.01 degrees greater, 0.02 degrees greater, or other similarly small angles. For example, if the critical angle of the bulk material or thin film material is 0.48 degrees, the first target incidence angle may be 0.5 degrees. The critical angle may be determined by performing X-ray reflectometry measurements on the sample (e.g., using the testing apparatus described herein) or may be determined from theoretical calculation described below.

$$\text{critical angle} = \sqrt{(2*\delta)} \quad (1)$$

The susceptibility $\delta$ of the material may be determined according to the following equation:

$$\delta = 2.78 \times 10^8 \frac{p\lambda}{M}[(Z + \Delta f')] \quad (2)$$

Where:
p is the density of the material;
Z is the atomic number of the material;
$\Delta f'$ is the real part of dispersion correction of scattering factor for the material;
$\lambda$ is the wavelength of the X-rays; and
M is the atomic mass of the material.

Identify Diffraction Peaks From Bulk Material or Thin Film Material

At 1610, once the sample 518 has been calibrated, the source 502 may be set at a pre-determined first target incident angle to perform a grazing incidence diffraction scan on the sample. As mentioned above, the pre-determined incident angle is adjusted by the Omega offset prior to scanning. The grazing incidence diffraction may be used to identify diffraction peaks from a thin film material deposited, grown, or produced in any other manner on a substrate to selectively obtain diffraction peaks from the thin film material without interference from the substrate. In the case of bulk materials, the grazing incidence diffraction technique can be used to selectively identify diffraction peaks from surface or sub surface regions of the bulk material. During the grazing incidence diffraction, the angle between source 502 and sample 518 may be fixed while the angle of detector 504 may be adjusted/moved through a range of angles to generate intensity measurements. For example, as illustrated in FIG. 4, the intensity of diffracted X-ray photons may be plotted against the Two Theta angle to determine which diffraction peaks having intensity have occurred. As illustrated in FIG. 4, for example, five diffraction peaks/reflections having sufficient intensity are present for the thin film material, e.g., Nickel, peak 1 at approximately 44.51 degrees (Ni, (1 1 1)), peak 2 at approximately 51.85 degrees (Ni, (2 0 0)), peak 3 at approximately 76.37 degrees (Ni, (2 2 0)), peak 4 at approximately 92.94 degrees (Ni, (3 1 1)), and peak 5 at approximately 98.45 degrees (Ni, (2 2 2)). By performing the grazing incidence diffraction scan, the diffraction peaks from the thin film material may be determined without interference from the substrate Likewise, diffraction peaks from a surface region or sub surface region of the bulk material may be determined without interference from other regions of the bulk material.

Select Desired Diffraction Peak/Reflection for Further Scanning

At 1612, once the locations of the diffraction peaks from the bulk material or thin film material have been identified, further scanning may be performed. In some aspects, for example, one of the diffraction peaks may be selected for further scanning. In some aspects, the diffraction peak having highest intensity may be selected. For example, peak Ni (1 1 1) of FIG. 4 may be selected as the highest intensity diffraction peak.

In some aspects, for example, the diffraction peak that has the largest spacing in Two Theta degrees from adjacent peaks may be selected. For example, peak Ni (1 1 1) from FIG. 4, has a Two Theta angle of approximately 44.51 degrees. The closest adjacent peak is Ni (2 0 0) which has a Two Theta angle of approximately 51.85 degrees. Thus the spacing between peak Ni (1 1 1) and Ni (2 0 0) is approximately 7.34 degrees. As another example, peak Ni (2 2 0) has a Two Theta angle of approximately 76.37 degrees. The adjacent peaks are Ni (3 1 1), which has a Two Theta angle of approximately 92.94 degrees, and Ni (2 0 0) which has a Two Theta angle of approximately 51.85 degrees. The spacing between peak Ni (2 2 0) and peak Ni (3 1 1) is approximately 16.57 degrees and the spacing between peak Ni (2 2 0) and peak Ni (2 0 0) is approximately 24.52 degrees. Thus peak Ni (2 2 0) has a larger spacing from adjacent peaks than peak Ni (1 1 1). Selecting the peak with the largest spacing in Two Theta degrees from adjacent peaks may allow the selected peak to be further scanned with minimum/no interference from other peaks. For example, the intensity values surrounding peak Ni (2 2 0) are at a minimal value for a larger amount of Two Theta values before the intensity increases to the adjacent peaks Ni (2 0 0) and Ni (3 1 1).

Although example criteria for selecting a particular diffraction peak is described above, any other method of selecting diffraction peaks may be employed and further scanning may be performed on any other peak. In some aspects, more than one peak may be selected for a further round of scanning.

Setting the Second Target Incident Angle

At 1614, once a diffraction peak from the material of interest, e.g., thin film material or bulk material, has been selected from the initial grazing incidence diffraction measurements, a second target incidence angle relative to the sample based on the Omega offset and desired penetration depth into the bulk material or thin film material is selected.

Figure 19B:
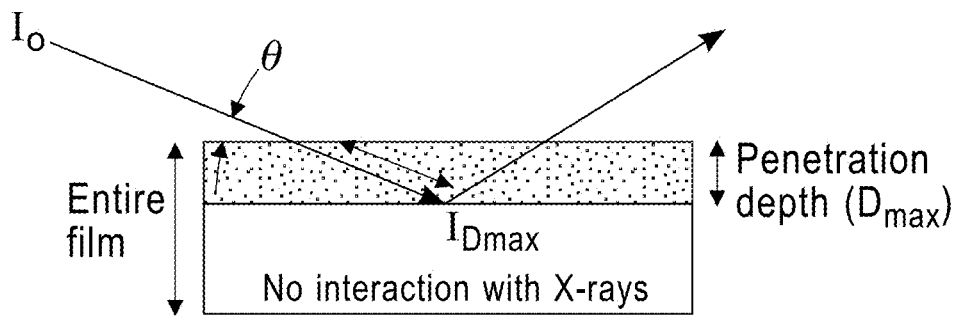
FIG. 19b is a figurative description of the penetration depth of X-rays into a thin film material or a bulk material.

The penetration depth of X-rays at a fixed incident angle, as described in FIG. 19b, can be estimated using the following equation:

$$D_{max} \text{ or}$$
$$X\text{-ray penetration depth} = \frac{4.606 * \sin(\text{incident angle})}{2 * (u/p) * p} \quad (3)$$

Where:
p is the density of the material;
u/p is the mass attenuation coefficient of X-rays for the material;

In some aspects, one or more incident angles other than second target incidence angle may be chosen. For example, in the case of Nickel films, an incident angle of 0.5 degrees, an incident angle of 5 degrees, and an incident angle of 10 degrees may be used. In the case of Nickel, an incident angle of 0.5 degrees may achieve a penetration depth of 0.46 μm, an incident angle of 5 degrees may achieve a penetration depth of 4.25 μm, and an incident angle of 10 degrees may achieve a penetration depth of 7.77 μm.

Scanning of Selected Diffraction Peak at Different Sample Tilts (ψ)

Once the diffraction peak and incident angle have been selected, Two Theta scans around the selected diffraction peak may be carried out at different sample tilt/psi/ψ positions at 1616. However the incident angle is at a fixed position. During the Two Theta scan, the diffracted X-ray photon intensity and Two Theta position is recorded by scanning the detector around the Two Theta position of the selected diffraction peak. The ψ values used may range from 0 to 90 degrees. In some instances a limited ψ range may be used such as 0 to 45 degrees. In some instances fixed or varied intervals may be used for a particular ψ range. In some instances two ψ values may be used, such as 0 and 90 degrees. In other instances two ψ values may be used, such as 0 and 45 degrees. In some instances two or more ψ values may be used, such as 0, 10, 20, 30, 40, 50, or any other number of degrees.

Analyzing the Measurement Data

Figure 20:
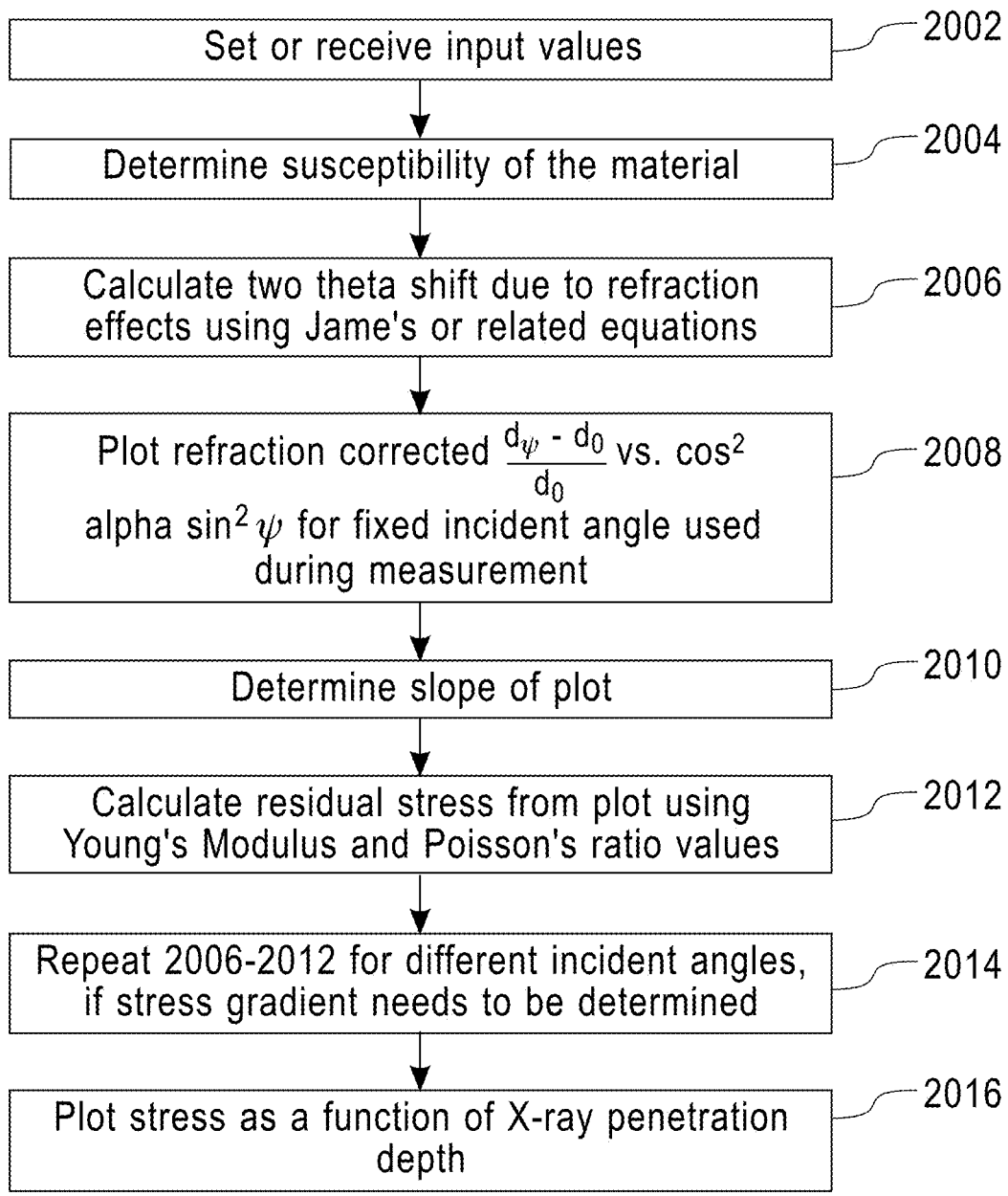
FIG. 20 is a flow chart of a method for analyzing measurement data in accordance with some aspects of the present disclosure.

At 1618 the measurement data, e.g., the series of intensity of X-ray photons vs. Two Theta collected at different sample tilt (psi) positions, may be analyzed to determine residual stress values at a certain depth into the sample, while taking into account the Two Theta peak shift brought upon by refraction of X-rays at shallow incident angles according to the method illustrated in FIG. 20.

At 2002 a variety of inputs may be used as a basis for analysis of the measurement data. For example, the inputs may include incident angles adjusted by Omega offset, the Two Theta peak angles, ψ positions, the Miller indices for the selected diffracted peak/peaks, Young's Modulus values for selected diffracted peak/peaks, Poisson's ratio, the atomic weight of one or both of the elements constituting the bulk material or thin film material, the density of one or more element constituting the bulk material or thin film material, a real part of dispersion of one or more elements constituting the bulk material or thin film material, and an atomic number of one or more elements constituting the bulk material or thin film material. Some or all of these inputs may be determined or identified with reference to known sources on material properties or composition including, for example, periodic tables, materials charts, text books, or other similar sources.

Some inputs that may be used for calculating stress may include the Two Theta peak positions (obtained from experimental data either by manual selection, using peak deconvolution using standard, user made, combined deconvolution methods/algorithms, or using other methods or a combination of methods), ψ positions (used during experiment), corrected incidence angle used for measurement (which includes Omega Offset), and elastic constants (obtained from Material properties found in Hand books or other reliable sources).

Determine Susceptibility of the Material

At 2004, the susceptibility δ of the material may be determined according to the following equation:

$$\delta = 2.78 \times 10^8 \frac{p\lambda}{M}[(Z + \Delta f')] \quad (4)$$

Where:
p is the density of the material;
Z is the atomic number of the material;
Δf' is the real part of dispersion correction of scattering factor for the material;
λ is the wavelength of the X-rays; and
M is the atomic mass of the material.

Determining Refractive Index Shift

At 2006, the two theta shift due to refraction effects may be calculated, e.g., using James equation or related equations.

Figure 21:
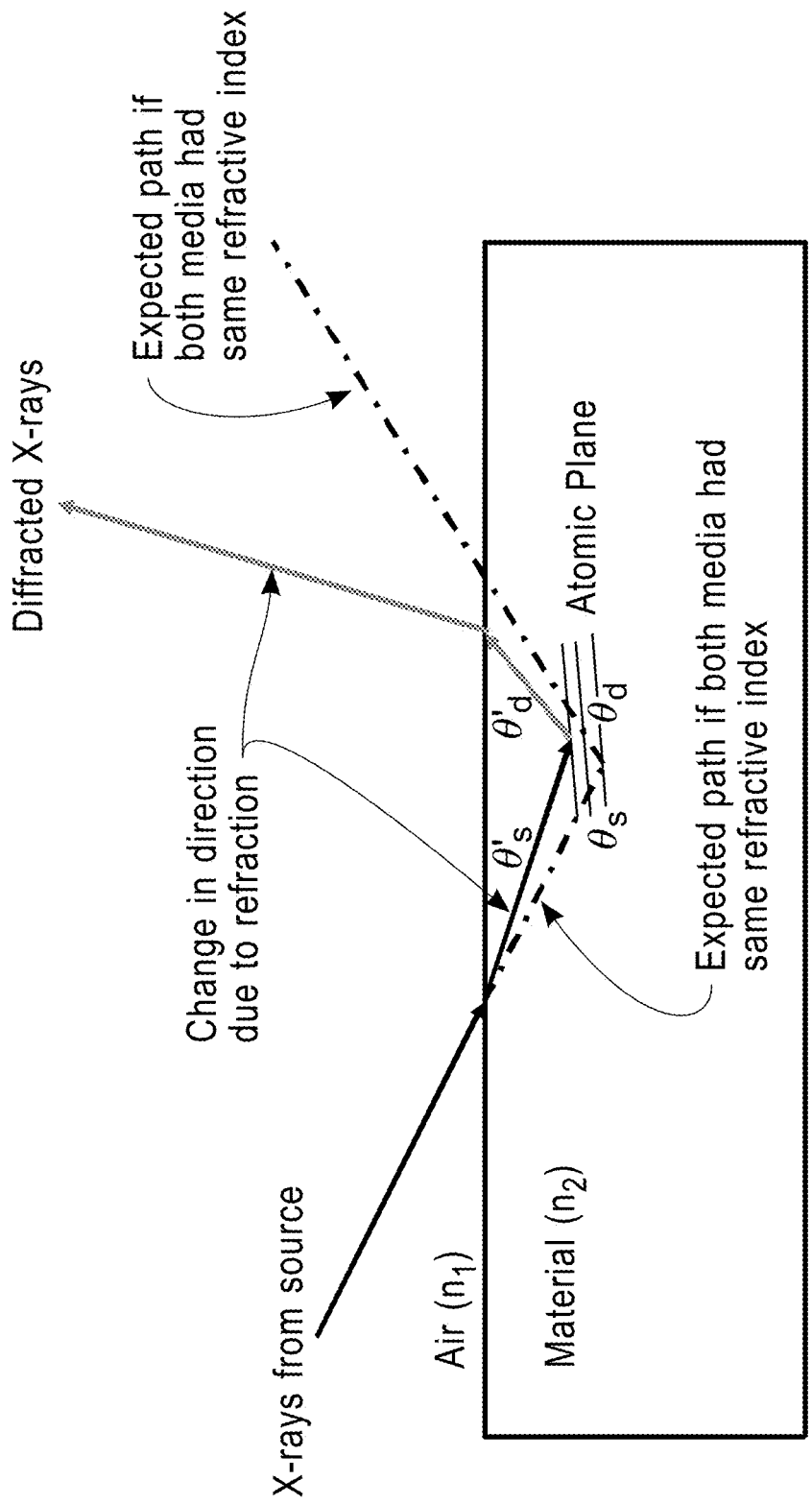
FIG. 21 is a diagram illustrating the effects of refraction on a sample in accordance with some aspects of the present disclosure.

The effects of refraction on an X-ray entering the sample material are generally described with reference to FIG. 21.

Materials may have a negative index of refraction for X-rays. As illustrated in FIG. 21, for example, at shallow angles, as X-rays from a source travels from a first medium, e.g., air to a second medium, e.g., the material, where the mediums have different refractive indices, e.g., $n_1$ and $n_2$, there is a change or shift in the propagation direction of the X-ray beam, illustrated by the solid lines. For example, as seen in FIG. 21, rather than proceeding through the second medium at the original angle of the X-ray from the source, $\theta_s$, as depicted in dashed and dotted lines, once the X-ray enters the second medium, the X-ray is instead refracted to an angle $\theta'_s$. Likewise, when the X-ray reflects off of the atomic plane of the second medium, the X-ray reflects within the second medium at an angle $\theta'_d$. As the X-ray reflection exits the second medium and enters the first medium, the X-ray reflection is further refracted from angle $\theta'_d$ to a final diffracted angle, illustrated by the solid arrow exiting the second medium.

Absent refractions due to different medium properties, i.e., if the first and second mediums have the same refractive index, the X-ray would travel through the first and second mediums at the angle $\theta_s$, reflect from the atomic plane of the second medium at a reflection angle $\theta_d$, and travel from the second medium back to the first medium at the same angle $\theta_d$.

As an example, the shift or change due to a difference in refractive indexes of media may be similar to how an object appears to shift when under water as viewed from outside of the water. For example, a coin at the bottom of a swimming pool filled with water may appear to be located in one location as observed from outside of the swimming pool but instead may actually be located in a different location within the pool as confirmed by observing the coin from within the water of the pool.

Refraction effects at shallow incidence angles causes shifts in recorded Two Theta peak positions of the sample, during measurements carried out using high resolution grazing incidence X-ray diffraction stress technique. The residual stresses present in the sample may also cause a shift in the diffracted peak position. These competing effects may be addressed during analysis of the measurement data, for example, by removing or correcting for any Two Theta peak shifts caused by refraction of X-rays at shallow incident angles. This allows the shifts in diffracted peak position caused by residual stresses to be isolated from refraction effects.

In some aspects, the effects of refractive index peak shifts may be determined according to the James equation (1963):

$$2\theta_B = 2\theta_L + \frac{\delta}{\sin 2\theta_L}\left\{2 + \frac{\sin(b')}{\sin(2\theta_L - b')} + \frac{\sin(2\theta_L - b')}{\sin(b')}\right\} \quad (5)$$

Where:
$2\theta_B$ is the measured Bragg angle
$2\theta_L$ is the true Bragg angle
b' is the angle between the incident X-ray beam and sample surface
$\delta$ is the susceptibility of the material, as described earlier using equation 2

As described in equation 5 above, the refractive index induced peak shift is affected by the incident angle of the X-ray beam, Two Theta angle, material properties of the medium such as mass density and atomic number, the wavelength of the X-rays, real part of the dispersion correction of scattering factor, and other similar properties.

In some aspects, other formalisms related to or derived from Equation 5 may also be used for calculating refraction induced peak shift.

The peak shift due to refraction effects is dependent on the Material under analysis (affected by atomic weight, density, atomic number, real part of dispersion etc.), the wavelength of X-ray used, the grazing incident angle and Two Theta positions. As an example, in the case of a grazing incident diffraction measurement (0.84 degrees incident angle) on a Tungsten (W) film using Chromium K Alpha 1 X-rays, the W (110) reflection would appear at a Two Theta of 62.2 degrees instead of 61.78 degrees, a 0.42 degree shift. In terms of d-spacing this corresponds to a shift of 0.0136 Angstroms. This shift needs to be accounted for in order to carry out precise estimation of residual stresses present in the Tungsten film or else inaccurate residual stress values may result. In addition this correction of the shift may be useful for keeping a $d_{spacing}$ vs. $\cos^2$ alpha*$\sin^2\psi$ plot consistent for stress measurements carried out at different grazing incident angles on the same sample.

Once the measurement data has been corrected for the Two Theta shift caused by the refraction of X-rays, the corrected measurement data may be analyzed to determine whether any residual stresses are present.

Figure 22:
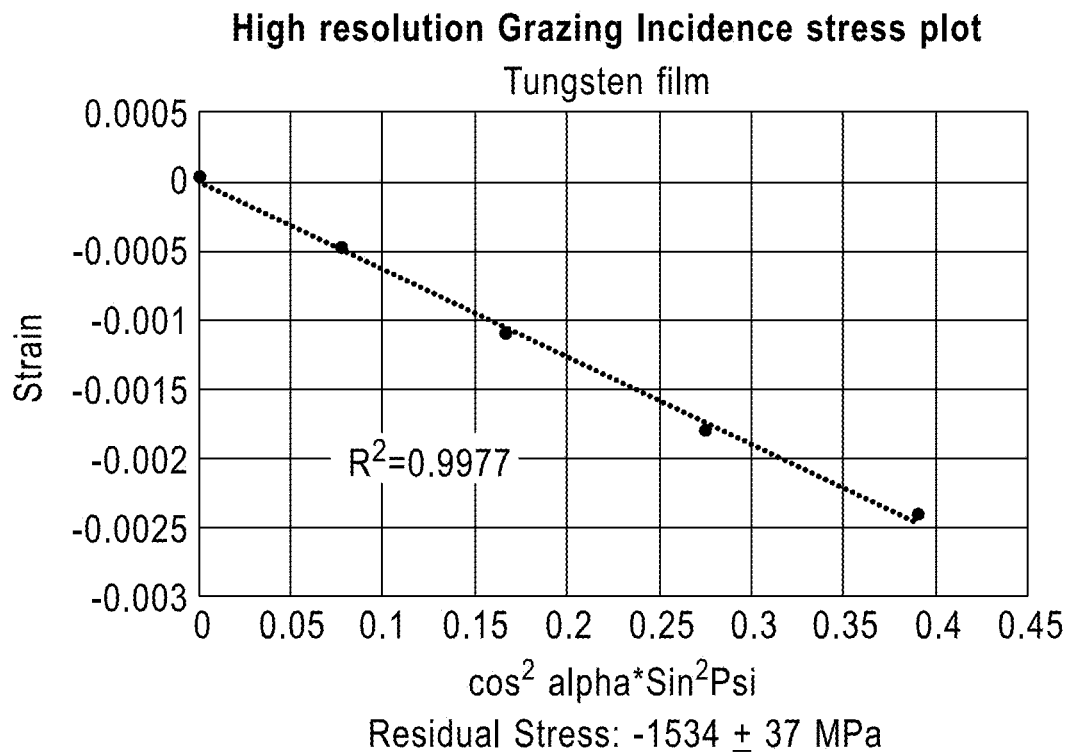
FIG. 22 is a plot of strain vs. $\cos^2$ alpha*$\sin^2 \psi$ based on measurements from a Tungsten thin film material sample using the high resolution grazing incidence X-ray diffraction technique in accordance with some aspects of the present disclosure.

Calculate Residual Stress
At 2008, $$\frac{d_\psi - d_0}{d_0}$$

is plotted vs. $\cos^2$ alpha*$\sin^2\psi$ for each incident angle used during the measurements as illustrated, for example, in FIG. 22. The $d_{spacings}$ at different $\psi$ positions, i.e., $d_\psi$, may be calculated based on the corrected Two Theta values, using Bragg's law as follows:

$$\lambda = 2 * dspacing * \mathrm{Sin}\left(\frac{\mathrm{Corrected\ Two\ Theta}}{2}\right) \quad (6)$$

Figure 23:
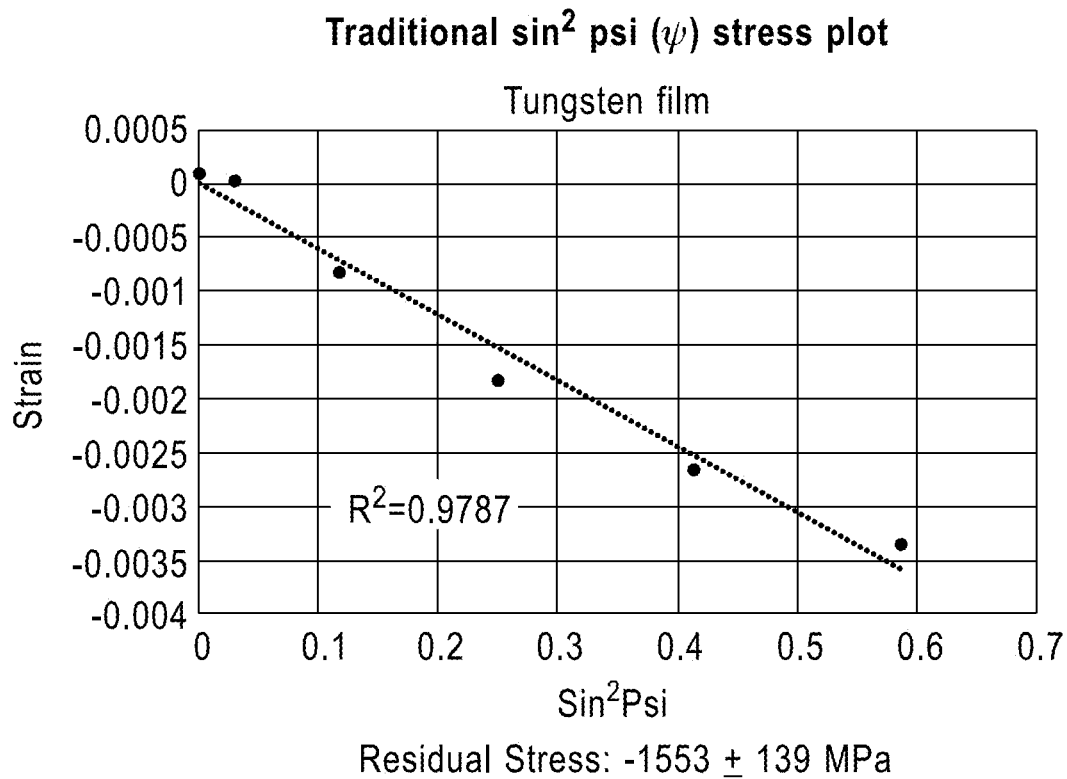
FIG. 23 is a plot of strain vs. $\sin^2 \psi$ based on measurements from a Tungsten thin film material sample using the traditional $\sin^2 \psi$ in accordance with some aspects of the present disclosure.

Where:
$\lambda$ is wavelength of X-rays used;
At 2010, a slope of the plot $$\frac{d_\psi - d_0}{d_0} \quad vs.\quad \cos^2 alpha * \sin^2\psi$$

is determined using any conventional method. For example, as illustrated in FIG. 22, the slope of the plot is −0.0063. As can be seen, the slope of the plot has a $R^2$ value of 0.9977 which indicates how close the slope fits to a trend line of the data which is an improvement over simply applying the $\sin^2\psi$ stress technique to the same sample as illustrated in FIG. 23 with a $R^2$ value of 0.9787. In addition, it is clearly shown here that the High Resolution Grazing Incidence stress technique has a good correlation to the stress measured using traditional $\sin^2\psi$ method. This is made possible because of the comprehensive method described herein, which includes methods for instrument alignment, sample placement, adjustment, Omega offset correction, Two Theta selection, Refraction correction on measured Two theta values or d-spacing, etc.

At 2012, the residual stress may be calculated based on the slope of the plot using Young's modulus and Poisson's ratio according to the following equation:

$$\sigma_\varphi = \frac{E}{(1+v)}(\text{slope}) \quad (7)$$

Where:
$\sigma_\varphi$ stress at a certain phi or sample rotation position;
slope is obtained from plot of $$\frac{d_\psi - d_0}{d_0} \text{ vs. } \cos^2\text{alpha} * \sin^2\psi$$

E is Young's Modulus;
v is Poisson's Ratio;
$\psi$ is the tilt angle of the sample;
$d_\psi$ is the d-spacing at a certain $\psi$;
$d_0$ is the stress free d-spacing;

$$\text{alpha} = \frac{\text{refraction corrected two theta}}{2} - \quad (8)$$

$$\text{incident angle (Omega offset corrected)}$$

As illustrated in FIG. 22, for example, the residual stress is calculated as −1534±37 Mpa using the High Resolution Grazing Incidence $\sin^2 \psi$ technique. In contrast, as illustrated in FIG. 23, the residual stress calculated from the $\sin^2 \psi$ stress technique results in a calculated as −1553±139 MPa. While the residual stress value is approximately the same, −1534 vs. −1553, the error bar for the High Resolution Grazing Incidence $\sin^2 \psi$ technique is much smaller, ±37 Mpa vs. ±139 MPa, and provides a more definite estimation of the residual stresses present in the bulk material or thin film material of the sample.

In some aspects, one may also account for refraction effects by simply altering the stress free d-spacing $d_0$, by introducing refraction correction mechanisms described in this work, and in this case the measured two theta or d-spacing does not have to be corrected.

At 2014, steps 2006-2012 may be repeated for different incident angles if the stress gradient of the material needs to be determined.

At 2016, the residual stress as a function of x-ray penetration depth may be plotted and output for presentation to a user, e.g., via a display of a display device.

Automated Testing and Analysis

Figure 24:
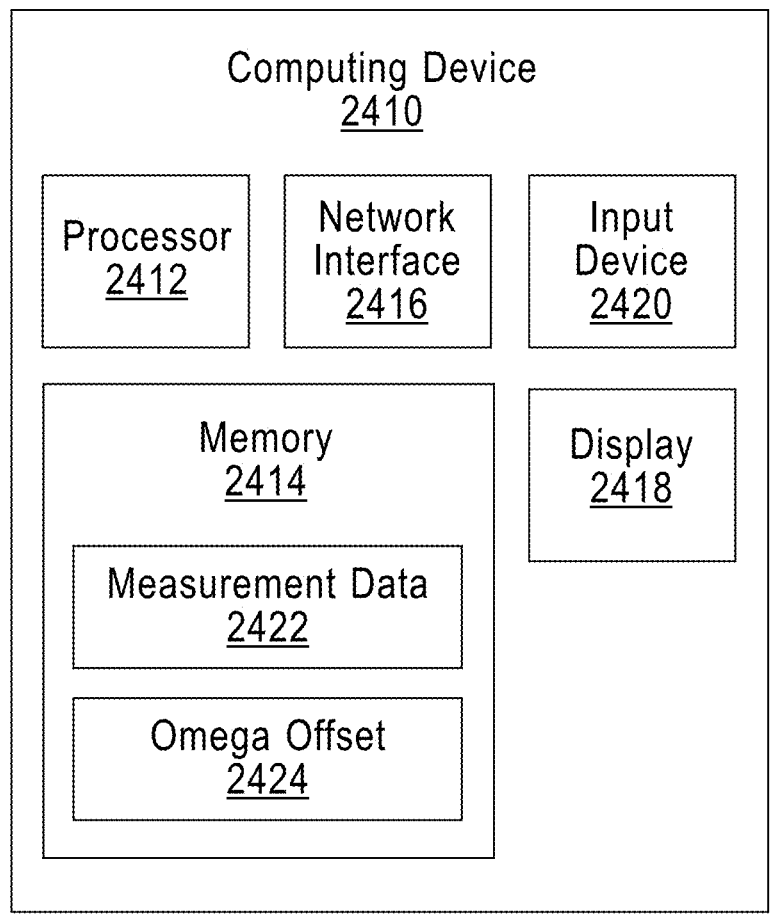
FIG. 24 is a block diagram of a computing device that may be used for performing some or all of the high resolution grazing incidence X-ray diffraction technique in accordance with some aspects of the present disclosure.

In some aspects, some or all of the above methods, determinations, alignments, adjustments, measurements, scans, calculations or other features may be performed by a computing device 2410 with reference now to FIG. 24.

In some aspects an automated sample handler systems using devices such as robotic arm, robotic loader, sample tray, sample loader, conveyer belt etc., or using other means, may be incorporated or used to enable automated high resolution grazing incidence residual stress measurements and analysis.

Computing device 2410 includes at least one processor 2412, memory 2414, at least one network interface 2416, a display 2418, an input device 2420, and may include any other features commonly found in a computing device. In some aspects, computing device 2410 may, for example, be a computing device associated testing apparatus 500 (FIGS. 5 and 6). In some aspects, computing device 2410 may include, for example, a personal computer, laptop, tablet, smart device, or any other similar computing device that may be used by a user of testing apparatus 500. In some aspects, computing device 2410 may be integrated as part of testing apparatus 500.

Processor 2412 may include, for example, a microcontroller, Field Programmable Gate Array (FPGAs), or any other processor that is configured to perform various operations. Processor 2412 may be configured to execute instructions as described below. These instructions may be stored, for example, in memory 2414.

Memory 2414 may include, for example, non-transitory computer readable media in the form of volatile memory, such as random access memory (RAM) and/or cache memory or others. Memory 2414 may include, for example, other removable/non-removable, volatile/non-volatile storage media. By way of non-limiting examples only, memory 2414 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In some aspects, memory 2414 may be configured to store measurement data 2422, the determined Omega offset 2424, or any other setting or configuration for testing apparatus 500.

Network interface 2416 is configured to transmit and receive data or information to and from testing apparatus 500 or any other computing device via wired or wireless connections. For example, network interface 2416 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 2410 to transmit or receive information to or from testing apparatus 500.

Display 2418 may include any display device that is configured to display information to a user of computing device 2410. For example, in some aspects, display 2418 may include a computer monitor, television, smart television, or other similar displays. In some aspects, display 2418 may be integrated into or associated with computing device 2410, for example, as a display of a laptop, smart phone, smart watch, or other smart devices, as a virtual reality headset associated with computing device 2410, or any other mechanism for displaying information to a user. In some aspects, display 2418 may include, for example, a liquid crystal display (LCD), an e-paper/e-ink display, an organic LED (OLED) display, or other similar display technologies. In some aspects, display 2418 may be touch-sensitive and may also function as an input device 2420. In some aspects, for example, computing device 2410 may be configured to present a plot of $d_{spacing}$ vs. $\cos^2$ alpha*$\sin^2 \psi$ to a user of computing device 2410 via display 2418.

Input device 2420 may include, for example, a keyboard, a mouse, a touch-sensitive display 2418, a keypad, a microphone, or other similar input devices or any other input devices that may be used alone or together to provide a user with the capability to interact with computing device 2410.

In some aspects, processor 2412 may execute one or more programs or instructions stored in memory 2414 to perform any of the above mentioned functions including, for example, apparatus calibration, calibrating sample alignment, determining the Omega offset, repositioning the sample, setting source and detector angles, identifying diffraction peaks, selecting diffraction peaks, activating scans of the sample, calculating susceptibility of the material, calculating the Two Theta shift, plotting $d_{spacing}$ vs. $\cos^2$ alpha*$\sin^2 \psi$, determining a slope of the plot, and calculating a residual stress from the plot. In some aspects, for example, processor 2412 may input or determine some or all of sample code/name, Omega Offset value, Omega or incident angle, or Omega angle with Offset value incorporated, psi ($\psi$) or sample tilt values, Sample phi/rotation position, Two theta values incident X-ray beam, density of the material, atomic number of the material, the real part of dispersion correction of scattering factor for the material, wavelength of the X-rays, mass attenuation coefficient of X-rays, the atomic mass of the material, stress free d-spacing/spacings, stress free two theta position, stress constant, Young's Modulus, Poisson's ratio, and Miller indices. In some aspects, for example, processor 2412 may perform any of these functions automatically. For example, processor 2412 may adjust the positioning of the sample and movement of the sample relative to the source and detector by controlling one or more actuators (not shown) of the testing apparatus 500, may receive measurement data 2422 from the detector 504, may receive or actively query one or more sources (not shown) or databases, locally or on the Internet, for the input values described above including known properties of the materials of the sample, and may analyze the measurement data as described above to calculate the residual stress of the materials of the sample. In some aspects, some or all of these functions may also require additional user input or adjustment.

In some aspects, processor 2412 may receive inputs such as, for example, Omega Offset value, Omega or incident angle, or Omega angle with Offset value incorporated, psi ($\psi$) or sample tilt values, Sample phi/rotation position, Two theta values incident X-ray beam, X-ray wavelength etc. directly from the user, e.g., via input device 2420 or from computer fed data files, e.g., stored in memory 2414 or received via network interface 2416.

In some aspects, Two Theta peak diffraction peak positions for refraction correction may be obtained from experimental data either by manual selection or using peak deconvolution using standard or user made or combined deconvolution methods/algorithms, using other methods, or using a combination of methods using peak fitting or peak deconvolution software.

Figure 25:
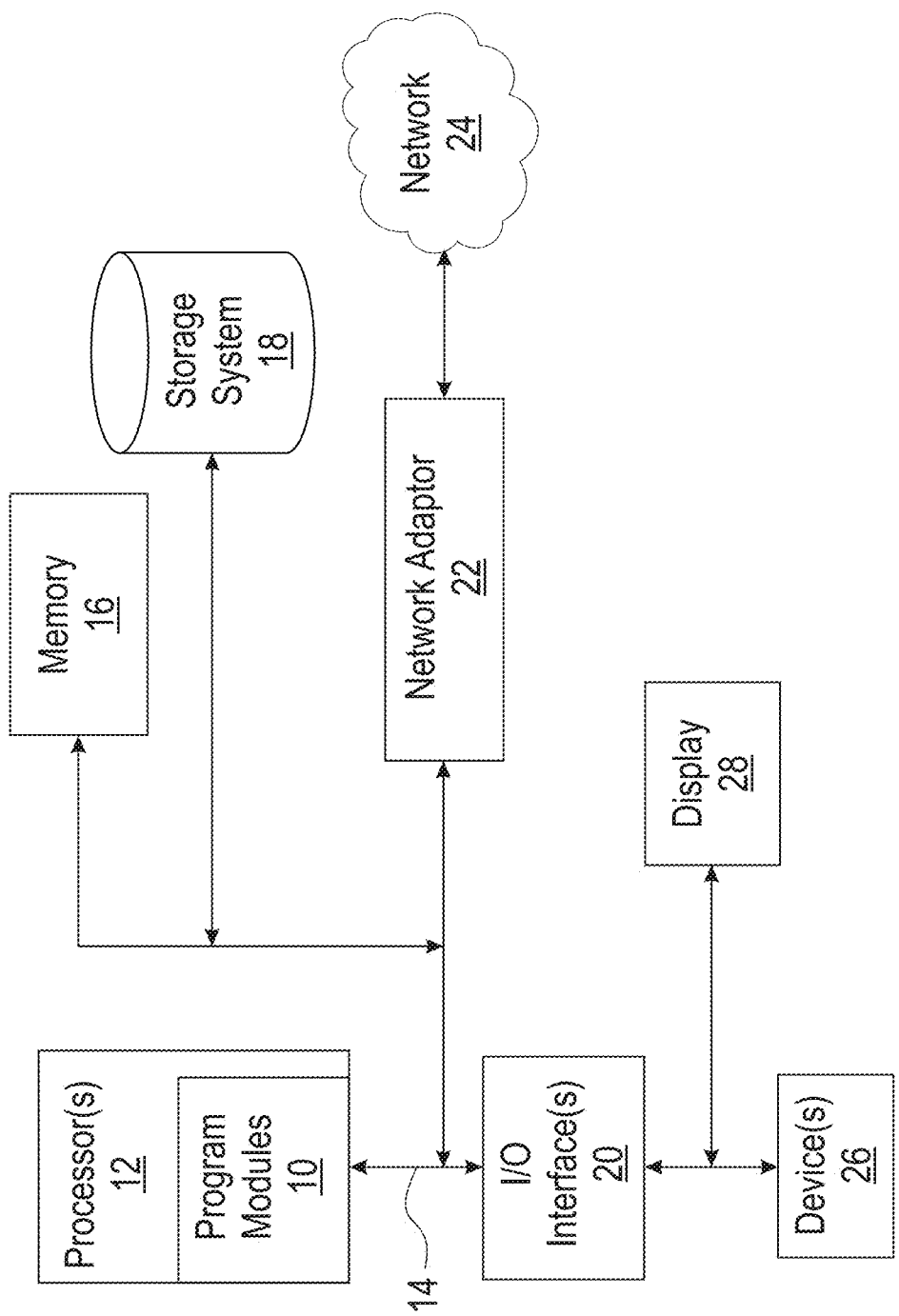
FIG. 25 is an exemplary block diagram of a computer system in which processes involved in the system, method, and computer program product described herein may be implemented.

FIG. 25 illustrates a schematic of an example computer or processing system that may implement any portion of computing device 2410, testing apparatus 500, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, the cloud, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A non-transitory computer readable medium comprising instructions that, when executed by at least one processor comprising hardware, configure the at least one processor to:

receive first measurement data comprising intensities of X-ray photons at a plurality of two theta angles, the first measurement data generated by a performance of a grazing incidence X-ray diffraction scan on a material with an incidence angle between an X-ray source and the material set at a first target incidence angle greater than the critical angle of the material;

analyze the first measurement data to identify a plurality of diffraction peaks from the material, each diffraction peak having an intensity occurring at a corresponding two theta value;

select a diffraction peak of the plurality of diffraction peaks based on the analysis of the first measurement data;

receive second measurement data, the second measurement data generated by a performance of two theta scanning on the material on a range of two theta values around the two theta value of the selected diffraction peak at a plurality of tilt positions;

apply refraction correction to the second measurement data, the refraction correction correcting the second measurement data for each tilt position of the scanned range of two theta values around the two theta value of the selected diffraction peak;

convert the corrected second measurement data measured at each tilt position to a d-spacing for each tilt position; and determine residual stress values of the material based on the converted corrected second measurement data.

2. The non-transitory computer readable medium of claim 1, wherein the first target incidence angle is based on an Omega offset of an X-ray beam generated by the X-ray source relative to the material with respect to the incidence angle between the X-ray source and the material as determined by a performance of an Omega scan on the material.

3. The non-transitory computer readable medium of claim 1, wherein the material is selected from the group consisting of a thin film material on a substrate and a bulk material.

4. The non-transitory computer readable medium of claim 1, wherein the instructions further configure the at least one processor to determine the susceptibility of the material, wherein the critical angle of the material is calculated based on the determined susceptibility.

5. The non-transitory computer readable medium of claim 4, wherein applying the refraction correction further comprises calculating the two theta shift due to the refraction of X-rays in the material based on the determined susceptibility and James equation.

6. The non-transitory computer readable medium of claim 1, wherein the two theta scanning on the material on the range of two theta values around the two theta value of the selected diffraction peak at the plurality of tilt positions is performed with the incidence angle between the X-ray source and the material set at a second target incidence angle based on the Omega offset and a desired penetration depth into the material.

7. The non-transitory computer readable medium of claim 1, wherein the two theta scanning is carried out at the plurality of tilt positions, and wherein the range of two theta scans may be selected based on a proximity to the selected diffraction peak.

8. The non-transitory computer readable medium of claim 1, wherein the instructions further configure the at least one processor to compare the two theta values of the plurality of diffraction peaks to determine a distance in two theta between each adjacent diffraction peak, wherein selecting the diffraction peak from the plurality of diffraction peaks comprises selecting the diffraction peak based on the determined distance in two theta between each adjacent diffraction peak.

9. The non-transitory computer readable medium of claim 8, wherein the instructions further configure the at least one processor to determine which diffraction peak of the plurality of diffraction peaks has a greater distance in two theta from adjacent peaks, wherein selecting the diffraction peak comprises selecting the diffraction peak that has a greater distance in two theta from adjacent peaks.

10. The non-transitory computer readable medium of claim 1, the instructions further configuring the at least one processor to:

receive third measurement data, the third measurement data generated based on a performance of a series of two theta scans on a range of two theta values around the two theta value of the selected diffraction peak at a plurality of tilt positions with the incidence angle between the X-ray source and the material set at a third target incidence angle based on the Omega offset and a second desired penetration depth into the material, wherein the residual stress values of the material are determined based at least in part on the third measurement data.

11. The non-transitory computer readable medium of claim 1, wherein the instructions further configure the at least one processor to plot $d_{spacing}$ vs. $\cos^2 \alpha * \sin^2 \psi$ for a plurality of penetration depths on the material.

* * * * *